US007158141B2

(12) United States Patent
Chung et al.

(10) Patent No.: US 7,158,141 B2
(45) Date of Patent: Jan. 2, 2007

(54) PROGRAMMABLE 3D GRAPHICS PIPELINE FOR MULTIMEDIA APPLICATIONS

(75) Inventors: Chris Yoochang Chung, Lynnwood, WA (US); Donglok Kim, Issaquah, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 32 days.

(21) Appl. No.: 10/053,431

(22) Filed: Jan. 17, 2002

(65) Prior Publication Data

US 2003/0151608 A1    Aug. 14, 2003

(51) Int. Cl.
*G06T 1/20* (2006.01)
*G06T 11/40* (2006.01)
*G06F 12/167* (2006.01)
*G06F 12/02* (2006.01)

(52) U.S. Cl. .................. 345/506; 345/552; 345/542; 345/557

(58) Field of Classification Search ................ 345/506, 345/557, 552, 501, 542, 553; 712/2, 7, 13
See application file for complete search history.

(56) References Cited

U.S. PATENT DOCUMENTS 5,467,459 A     11/1995  Alexander et al. .......... 395/480
6,104,415 A *   8/2000   Gossett ....................... 345/552
6,275,239 B1 *  8/2001   Ezer et al. .................. 345/473
6,333,743 B1 * 12/2001   Gossett et al. ............. 345/503
6,342,892 B1 *  1/2002   Van Hook et al. .......... 345/503

OTHER PUBLICATIONS

Basoglu, Chris, Karl Zhao, et al. *The MAP-CA VLIW-based Media Processor*. Paper from Equator Technologies, Inc. and Hitachi Ltd. Equator Hardware Reference: *MAP-CA Datasheet*. Equator Technologies, Inc. Document No. HWR.CA.DA., Feb. 7, 2001.

* cited by examiner

*Primary Examiner*—Kee M. Tung
*Assistant Examiner*—Hau Nguyen
(74) *Attorney, Agent, or Firm*—Ronald M. Anderson

(57) ABSTRACT

A programmable graphics pipeline and method for processing multiple partitioned multimedia data, such as graphics data, image data, video data, or audio data. A preferred embodiment of the programmable graphics pipeline includes an instruction cache, a register file, and a vector functional unit that perform partitioned instructions. In addition, an enhanced rasterization unit is used to generate inverse-mapped source coordinates in addition to destination output coordinates for graphics and other media processing. An enhanced texture address unit generates corresponding memory addresses of source texture data for graphics processing and source media data for media processing. Data retrieved from memory are stored in an enhanced texture cache for use by the vector functional unit. A vector output unit includes a blending unit for graphics data and an output buffer for wide media data.

15 Claims, 18 Drawing Sheets

PROGRAMMABLE 3D GRAPHICS PIPELINE FOR MULTIMEDIA APPLICATIONS

FIELD OF THE INVENTION

The present invention generally relates to graphics and media processing, and more specifically, to extending a three-dimensional (3D) graphics pipeline for both graphics and media processing.

BACKGROUND OF THE INVENTION

A technique commonly used in computer graphics involves rendering images using objects such as polygons, triangles, and lines. Such images are typically rendered in computer games, in computer aided design tools, in computer graphic art tools, etc. Generating graphic images sufficiently fast to meet high-speed performance requirements can require substantial hardware resources. Rendering 3D graphics, in particular, often requires a large amount of processing using dedicated hardware resources. To meet those requirements, a primarily pipelined architecture has proven most efficient. In pipelined architecture, a task is distributed into several serialized units. For example, high-level tasks, such as convolution and triangle rendering, can be distributed among a series of units. Multiple pipelines can also be operated in parallel to produce multiple outputs of picture elements (pixels). For instance, 3D graphics processors can use eight parallel pipelines to produce eight, 32-bit pixels every cycle, making use of parallel processing, but in a primarily pipelined architecture.

In contrast to rendering graphic images using primitive graphic objects, media processing includes any process that generates new media output data from an original source of media data. For example, imaging or image processing includes any process that generates a new image from an original image. Imaging includes image enhancement, restoration, reconstruction, compression, decompression, or other processing of original media. Similarly, video processing applies the above functions to a sequence of images derived from various types of original media Further, audio processing produces a new audio output from source audio data.

Media processing typically requires a different set of dedicated hardware resources than those used for rendering graphic images. For media processing, a primarily parallel architecture has proven most efficient. In a parallel architecture, several independent tasks are distributed among several parallel units. An example of a parallel architecture includes a conventional reduced instruction set computer (RISC) architecture with parallel processing features. Specific examples of media processors that utilize a parallel architecture include the TMS320C80™ by Texas Instruments Corp. and the media accelerated processor (MAP™) developed together by Hitachi Corporation and Equator Corporation. Parallel processing features include very long instruction word (VLIW) processing capability and single instruction multiple data (SIMD) processing capability. These features exploit the instruction-level and data-level parallelisms inherent in most imaging and video processing algorithms.

Although these features can provide high performance in imaging and video processing, the performance gain is limited by the amount of parallelism that can be mapped to the parallel processing units. To further improve performance, pipelining can also be used to accelerate individual units within the parallel architecture, such as for implementing a functional unit and a cache. Thus, media processors tend to employ some pipelining aspects, but in a primarily parallel processing architecture.

Attempts have been made to combine media processing with graphics processing. For example, U.S. Pat. No. 5,467,459 discloses a system that includes a parallel architecture for image processing, and includes a pipelined architecture for graphics processing. The parallel architecture and pipelined architecture are interconnected by a high-speed data bus to a high-bandwidth central shared memory. Although interconnected, this system still maintains separate architectures for processing media and graphics. It is preferable, instead, to utilize shared hardware resources to accomplish both parallel image processing and pipelined graphics processing. It is further desirable to utilize shared hardware resources to perform multimedia processing in general, including image processing, video processing, sound processing, and animation processing, as well as graphics processing. Sharing resources results in fewer transistors and other hardware components on a graphics processor and lower power consumption, which reduces costs.

SUMMARY OF THE INVENTION

The present invention provides a method and system for extending a 3D graphics pipeline to perform multimedia processing, including image processing, video processing, and audio processing in addition to graphics processing. Specifically, the present invention provides a programmable graphics pipeline for processing variable length data partitioned for texture filtering and other multimedia operations. Although extended from a graphics pipeline, the programmable graphics pipeline is capable of producing any form of corresponding multimedia output data, such as audio data, graphics pixel data, image pixel data, video pixel data, etc., depending on processing instructions and data access parameters identified by a host processor. A preferred embodiment of the programmable graphics pipeline includes an instruction cache, a register file, and a vector functional unit capable of performing instructions suitable for texture filtering and other multimedia computing, such as partitioned inner product instructions, partitioned arithmetic instructions, logic instructions, data movement instructions, and loop-control instructions. Adding the instruction cache and register file to a texture filtering unit of a graphics pipeline results in a vector processing engine (VPE) that is capable of processing graphics, images, and video data.

The programmable graphics pipeline can further include an enhanced texture cache to load and temporarily store variable lengths of partitioned data in accord with the size of multimedia data being processed. The data are retrieved from addresses in a main memory that are determined by an enhanced texture address unit. The enhanced texture address unit determines the addresses from perspective inverse-mapped coordinates of source data, such as graphics, image, or video data, corresponding to output pixel coordinates. Preferably, the enhanced texture address unit is further capable of generating filter coefficients for bilinear filtering or trilinear filtering of graphics texture data.

An enhanced Z-buffer unit is used to determine a depth of new output pixels in relation to old output pixels. In cases where perspective texture address generation cannot be used to provide perspective inverse-mapped coordinates, the enhanced Z-buffer unit may also be used to provide the enhanced texture address unit with variable access to the coordinates of the source graphics, image or video data.

The programmable graphics pipeline further includes an enhanced rasterization unit that generates the source coordinates in addition to the output coordinates (sometimes referred to as destination coordinates), which are passed to the enhanced Z-buffer or enhanced texture address unit. The source coordinates correspond to source graphics texture data or source media data, depending on the partitioned data size and instructions to be executed. The output coordinates correspond to primitives being rendered, such as a dot, a line, a triangle, a rectangle, or a polygon for graphics processing. Conversely, the output coordinates correspond to output media data for media processing. The enhanced rasterization unit, enhanced Z-buffer unit, enhanced texture address unit, and enhanced texture cache comprise a vector input unit.

If the VPE performs a graphics function, the VPE may pass the resulting data to a blending unit that can perform graphic blending functions, such as combining the resulting data with another color value or combining the blended value with a destination pixel value. However, if the VPE performs a media function, such as an image or video function, the VPE can pass the resulting data to an output buffer that is capable of concatenating successive media output data into wide data to reduce the number of subsequent write transactions to memory. The output buffer may also pass the concatenated data as input to the enhanced texture cache for functions that require subsequent processing. From the blending unit or output buffer, the blended or concatenated data can be passed to a write buffer that is capable of sending multiple write transactions to memory to reduce page misses. The blending unit, output buffer, and write buffer comprise a vector output unit. The vector input unit and vector output unit together are referred to as a vector streaming engine.

The programmable graphics pipeline may be configured with one or more parallel components to process each type of data more quickly. For example, two or more vector functional units can be placed in parallel to perform one instruction on multiple sets of graphics data or media data in parallel.

Another aspect of the invention is a corresponding method for processing variable length partitioned data with a pipeline primarily structured to process graphics data in order to produce a variety of different types of multimedia output data. The method includes the steps of obtaining configuration data from a host processor that includes a partitioned data size and a location of an instruction; performing graphics processing on graphics source data with the programmable graphics pipeline to produce graphics output data when the partitioned data size and the instruction correspond to graphics processing; and otherwise performing media processing on media source data with the programmable graphics pipeline to produce media output data when the partitioned data size and the instruction correspond to media processing.

For example, producing graphics pixel data is done in a well-known manner by mapping texture data from perspective inverse-mapped coordinates to output pixel coordinates, preferably using bilinear or trilinear filtering of 32-bit graphics data. By comparison, producing image pixel data employs the mapping technique with partitioned data, preferably 8-bit or 16-bit data. In a manner similar to the graphics processing, the programmable graphics pipeline is used to produce output coordinates, to produce mapped image coordinates corresponding to the output coordinates, and to produce memory addresses, where image data are stored corresponding to the mapped image coordinates. However, instead of retrieving texture data, the programmable graphics pipeline retrieves image data from the memory addresses and stores the retrieved data in the enhanced texture cache. The programmable pipeline then executes instructions corresponding to the desired image manipulation function on the retrieved data to produce the image pixel data at the output coordinate.

To process video data, the programmable graphics pipeline is configured to use alternate length partitioned data—preferably, 8-bit data for one or more sources of frame data and 16-bit data for a source of transform data. As above, the programmable graphics pipeline is used to produce output coordinates, to produce mapped frame coordinates corresponding to the output coordinates, and to produce memory addresses where frame data are stored corresponding to the mapped frame coordinates. Again, instead of retrieving texture data, the programmable graphics pipeline retrieves frame data from the memory addresses and stores the retrieved data in the enhanced texture cache. The programmable pipeline then executes instructions corresponding to the desired video manipulation function on the retrieved data to produce the video pixel data at the output coordinate. To perform the media functions, the programmable graphics pipeline executes a combination of partitioned inner product instructions, partitioned arithmetic instructions, partitioned logic instructions, data movement instructions, and at least one loop-control instruction. Once computed, the resulting media data are passed through the output buffer and write buffer to the main memory. Other partitioned data, such as audio data, may be processed in a similar fashion as image and video data.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 10A:
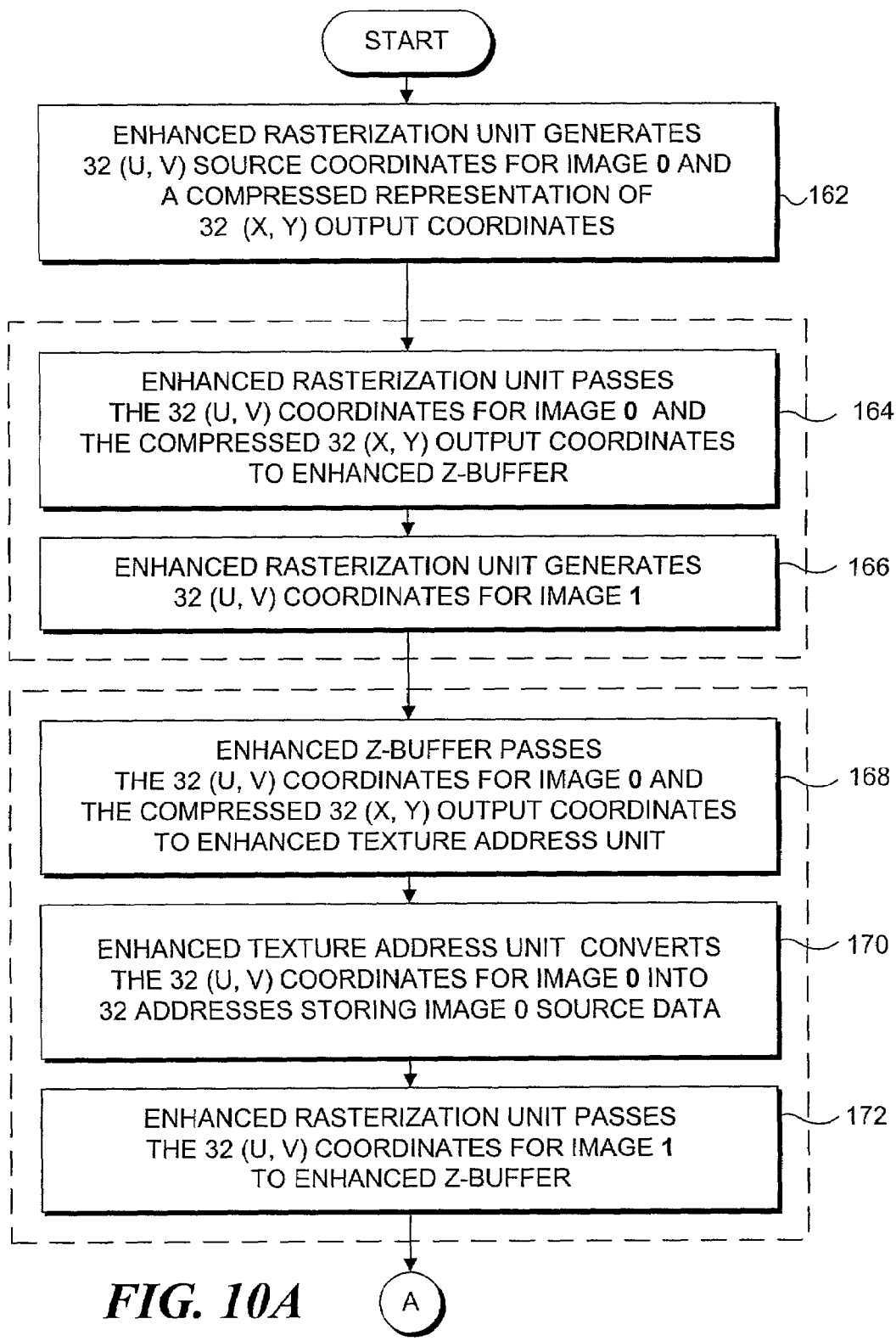
Figure 10B:
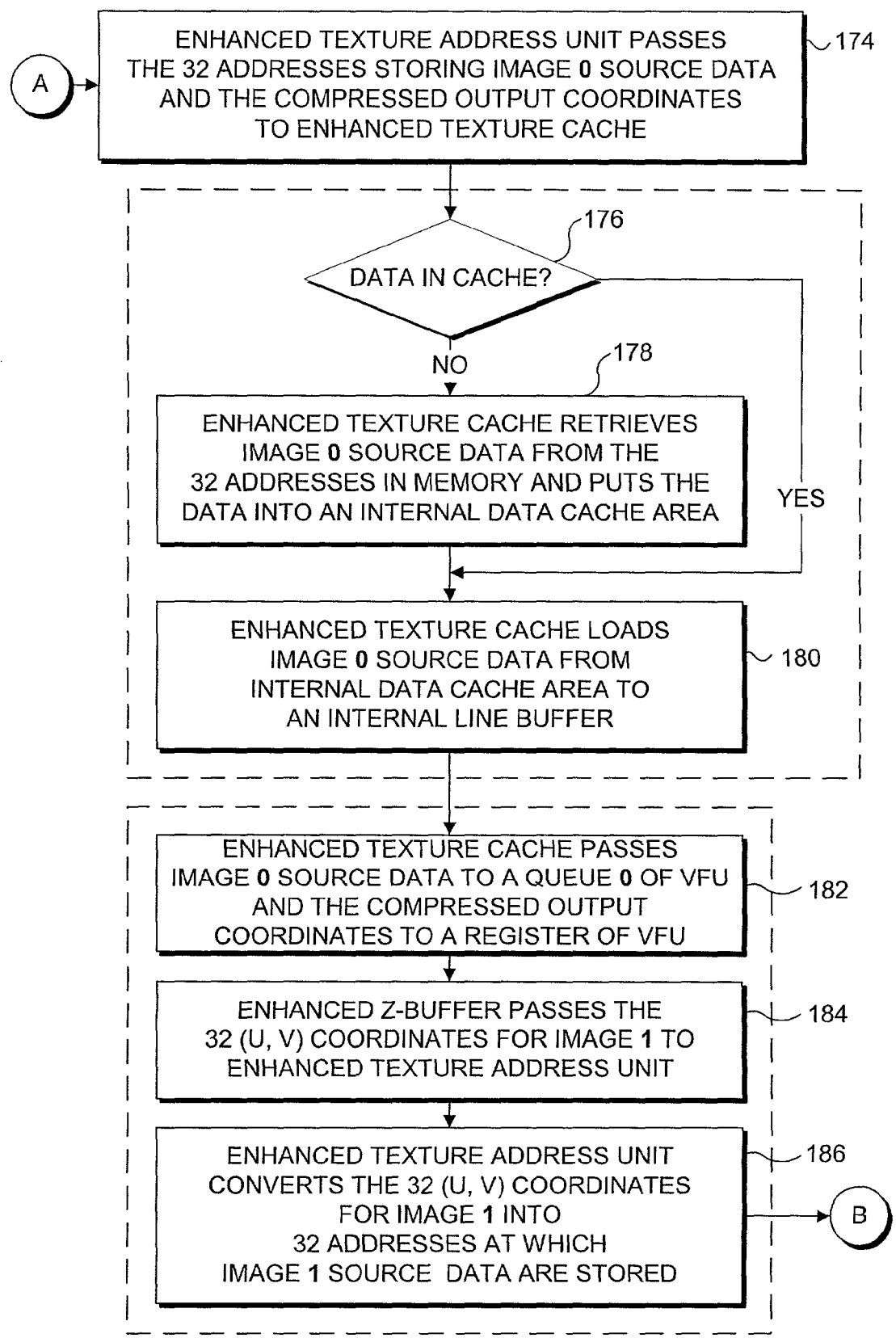
Figure 10C:
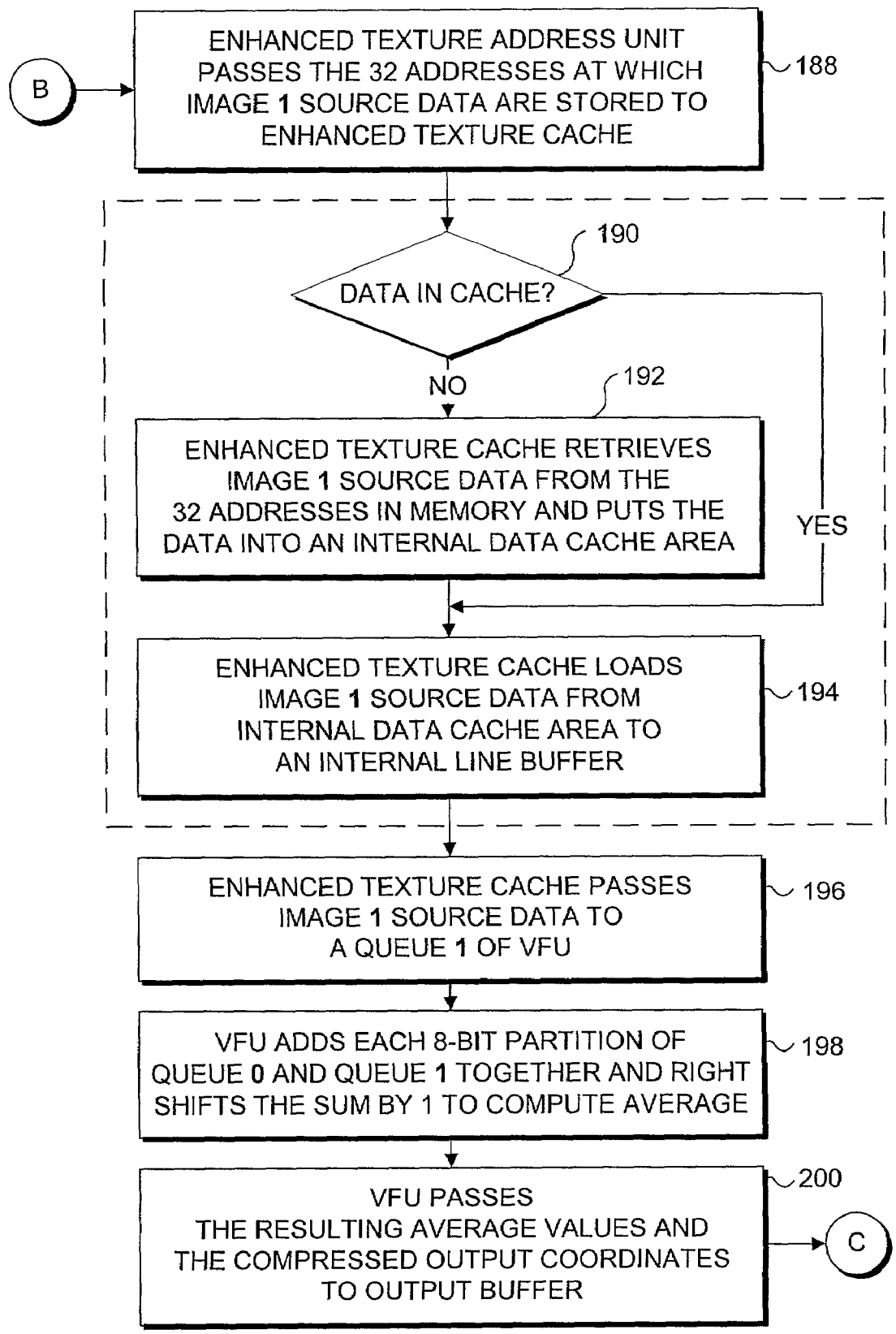
Figure 10D:
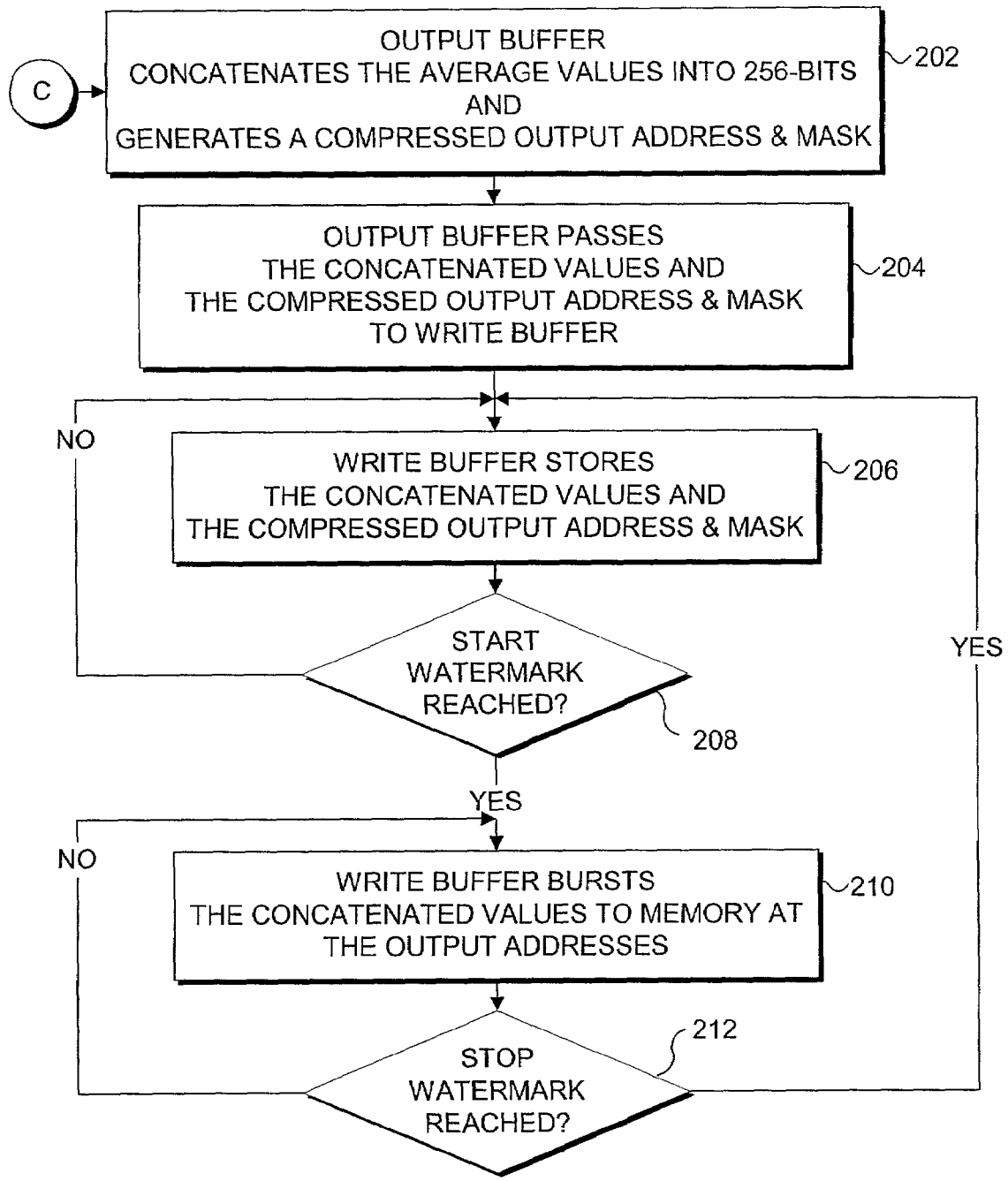
Figure 11A:
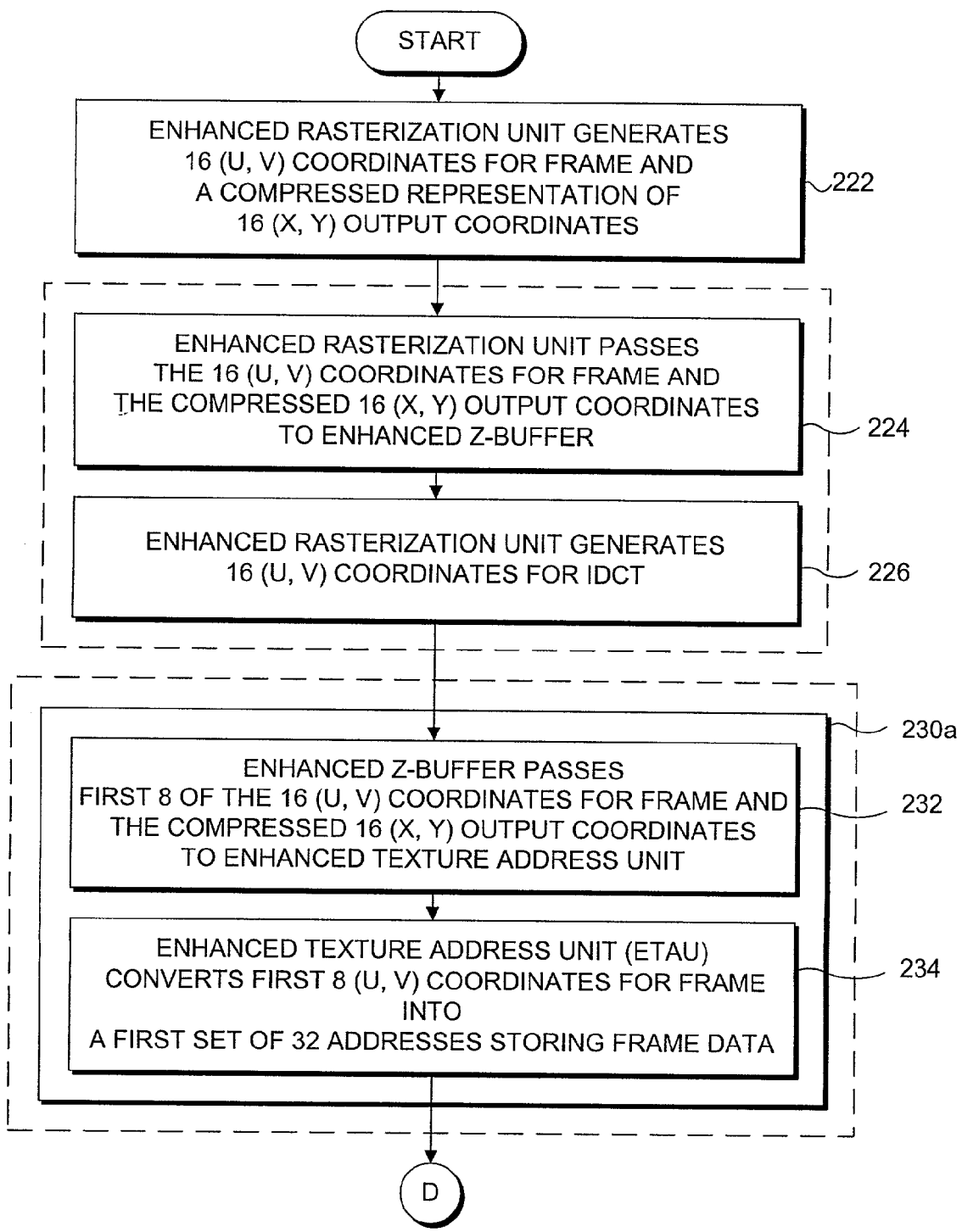
Figure 11B:
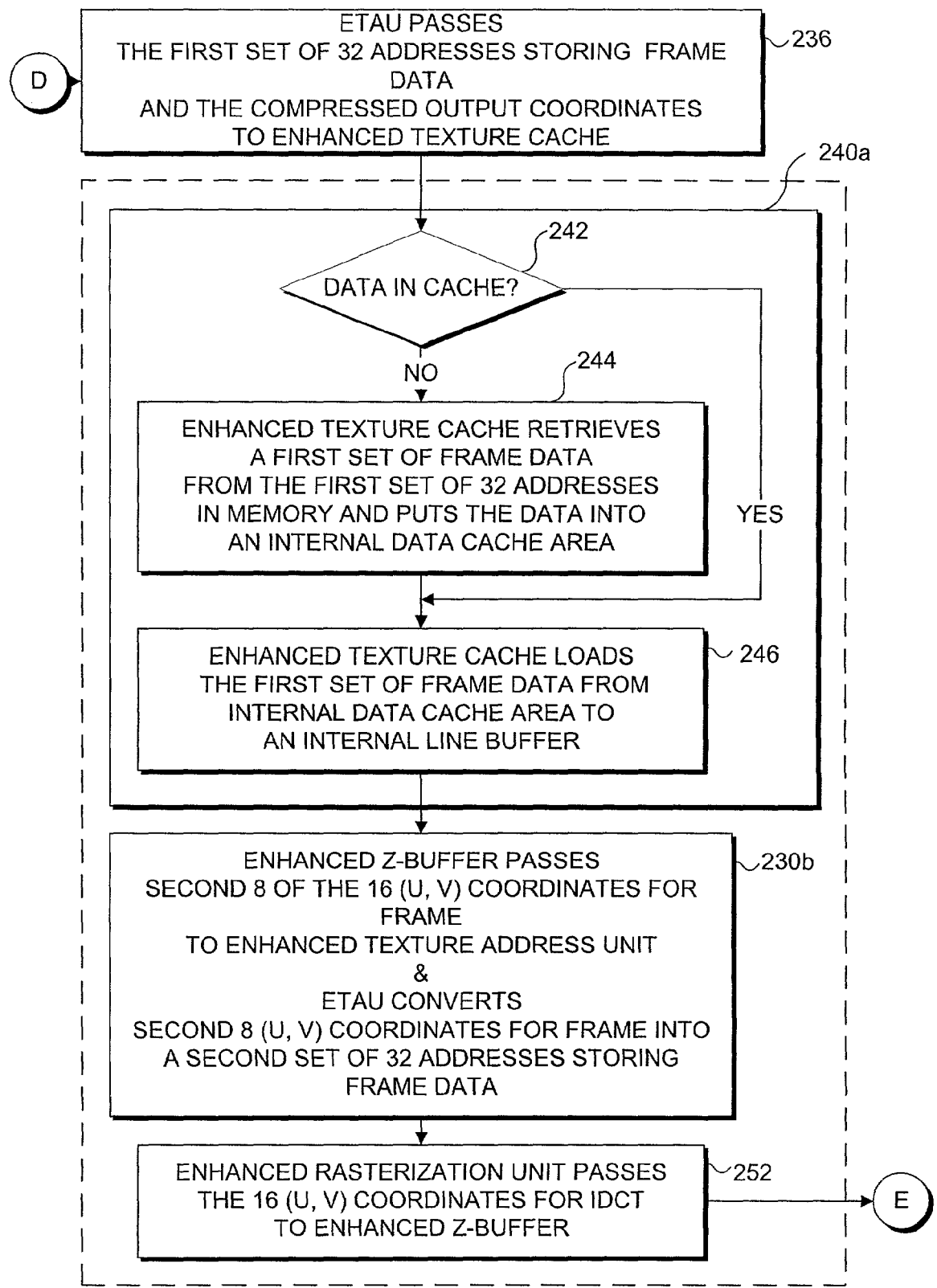
Figure 11C:
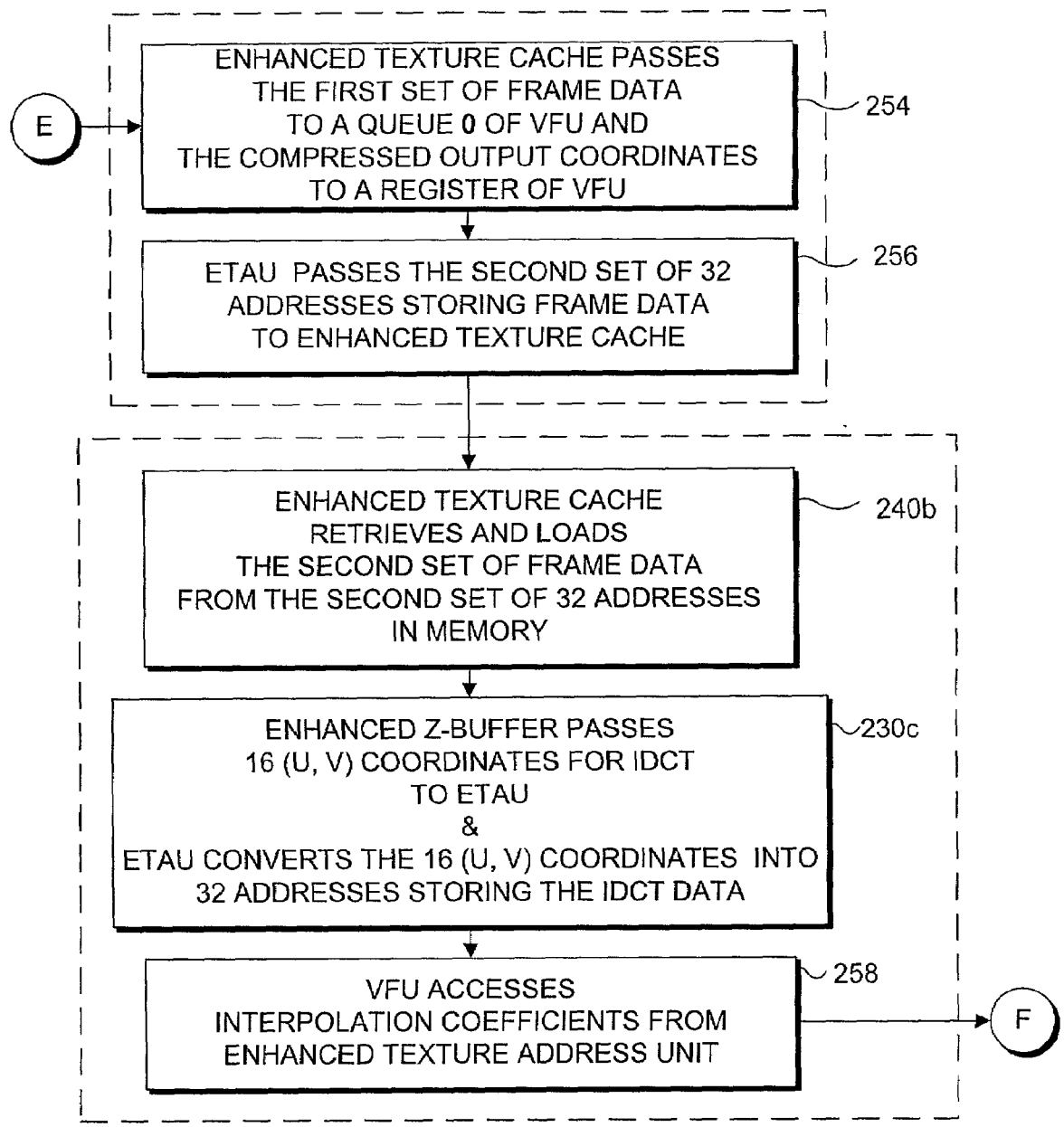
Figure 11D:
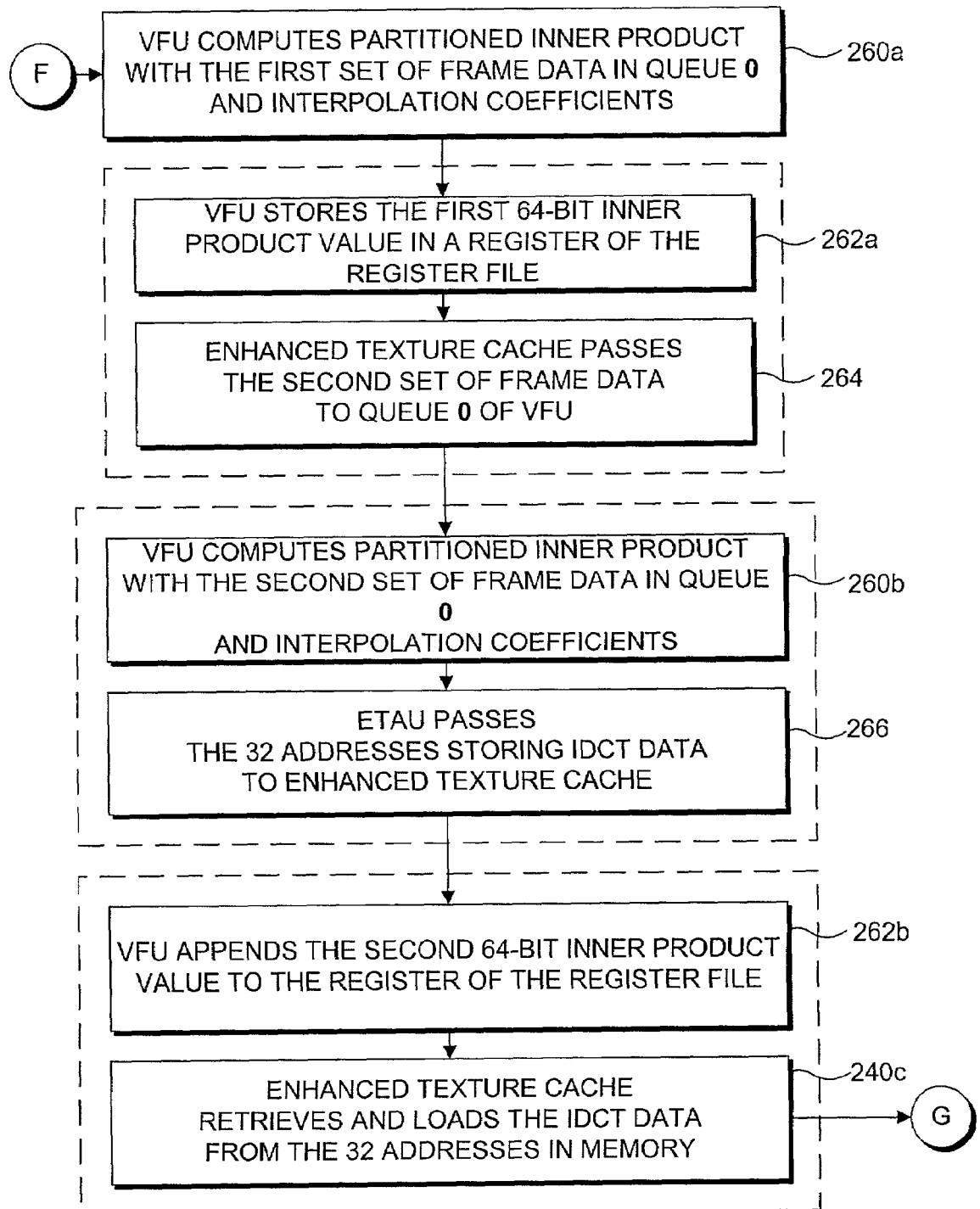
Figure 11E:
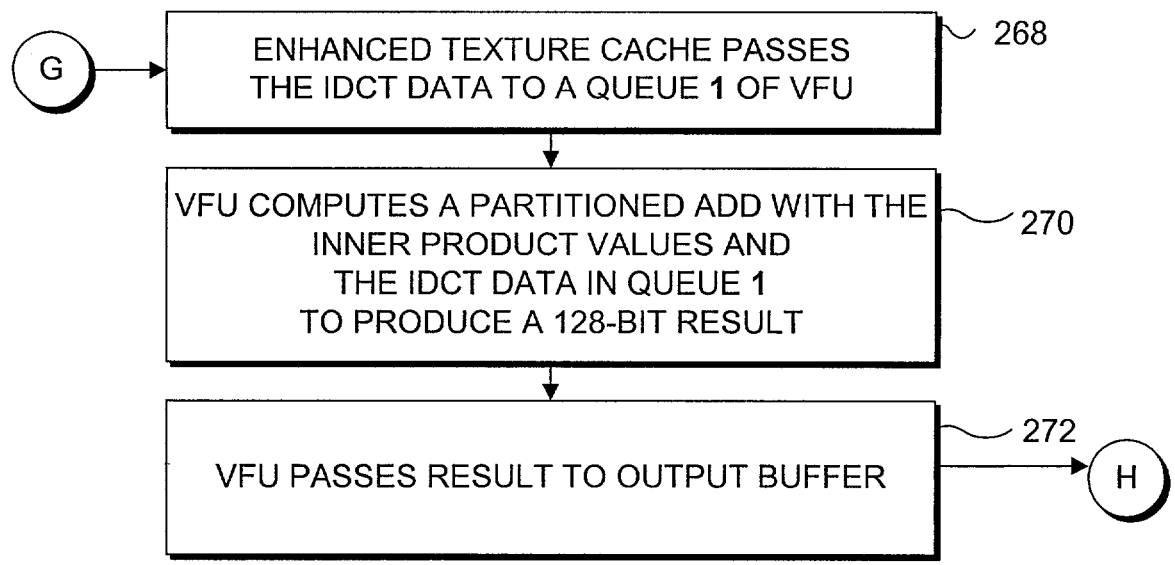
Figure 11F:
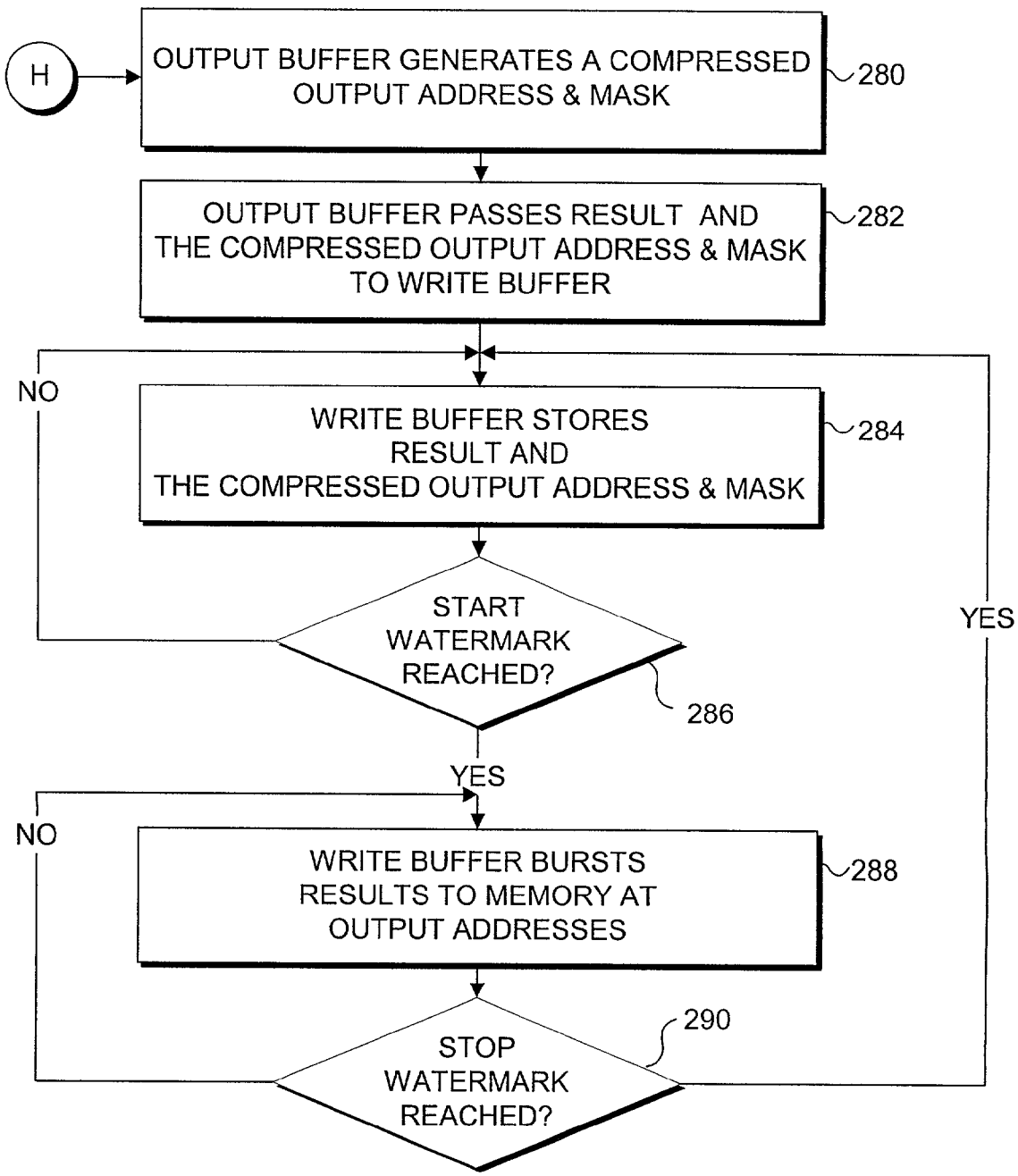

FIGS. 10-D comprise a flow diagram illustrating logic averaging two source images; where FIG. 10A illustrates logic for obtaining coordinates and corresponding memory addresses for the two source images to be averaged;

FIG. 10B illustrates continued logic for obtaining coordinates, corresponding memory addresses, and image data for the two source images to be averaged;

FIG. 10C illustrates continued logic for obtaining coordinates and corresponding memory addresses for the second source image, and for computing an image average using the vector functional unit in the image averaging operation; and FIG. 10D illustrates continuing logic for outputting image average values to a main memory;

FIGS. 11A–F comprise a flow diagram illustrating logic for performing P-type motion compensation; where FIG. 11A illustrates steps for obtaining coordinates and corresponding memory addresses for a video frame source and a transform source in the P-type video motion compensation operation;

FIG. 11B illustrates continued logic for obtaining a first set of frame data from memory and a second set of coordinates and memory addresses for the video motion compensation operation;

FIG. 11C illustrates continued logic for obtaining a second set of data for the reference frame and for obtaining memory addresses for the transform data in the video motion compensation operation;

FIG. 11D illustrates continued logic for bilinearly filtering the frame data and for obtaining the transform data from main memory for the video motion compensation operation;

FIG. 11E illustrates continued logic for adding the filtered data to the transform data for the video motion compensation; and FIG. 11F illustrates continuing logic for outputting motion compensation values to main memory.

DESCRIPTION OF THE PREFERRED EMBODIMENT

Figure 1:
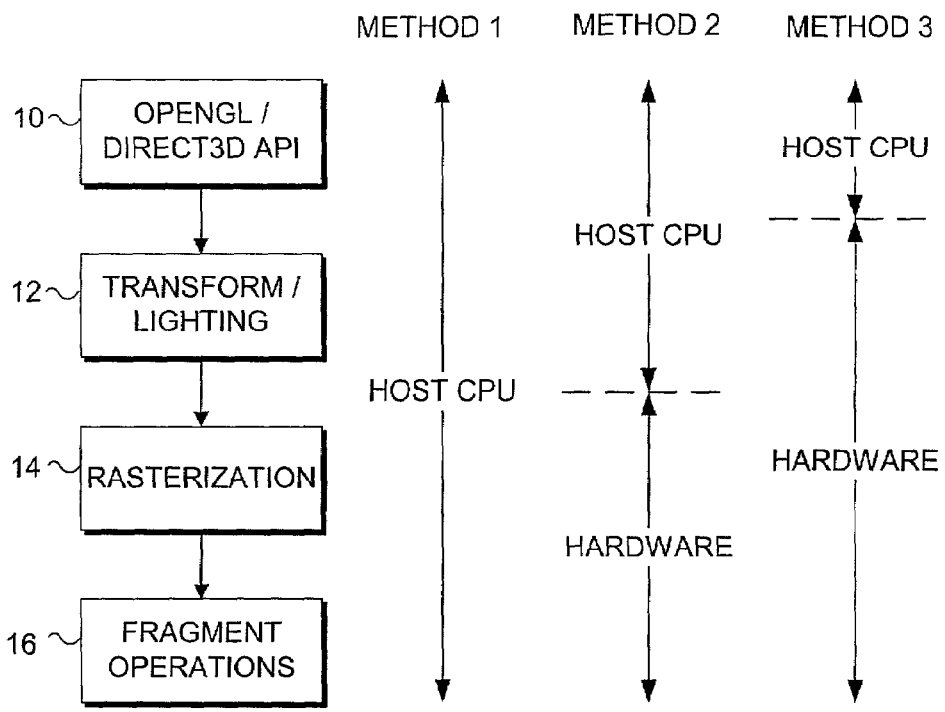
FIG. 1 is a schematic diagram illustrating typical 3D graphics pipeline layers and several ways in which responsibility for implementing these layers can be divided between a host central processing unit (CPU) and other hardware.

Most 3D graphics processors accelerate rendering speed with dedicated hardware pipelines that support the software pipelines of well-known graphics standards, e.g., OpenGL and Microsoft Corporation's DirectX™. FIG. 1 shows typical 3D graphics pipeline layers and several methods dividing the responsibility for carrying out these layers between a host CPU executing software instructions, and dedicated processing hardware. There are four pipeline layers in 3D graphics processing, including: (a) an application programming interface (API) layer 10; (b) a transform/lighting layer 12; (c) a rasterization layer 14; and (d) a fragment operations layer 16. To implement these layers, a CPU and/or dedicated processing hardware can be used in various combinations as shown in FIG. 1. In Method 1, the host CPU performs all of the processing. In Method 2, rasterization 14 and fragment operations 16 are processed in dedicated processing hardware, while in Method 3, transform/lighting 12 is also done by dedicated processing hardware. Although some advanced 3D graphics processors provide transform/lighting acceleration, Method 2 is commonly employed when more conventional graphics processors are used, since transform/lighting 12 requires expensive floating-point operations, which can be better processed by the host CPU instead of by the graphics processor. Therefore, a preferred embodiment of the present invention focuses on extending 3D graphics pipelines in the category of Method 2, in which the graphics processor is responsible for carrying out rasterization and fragment operation layers, while the host CPU is responsible for carrying out the API and transform/lighting layers.

3D Graphics Pipeline

Figure 2:
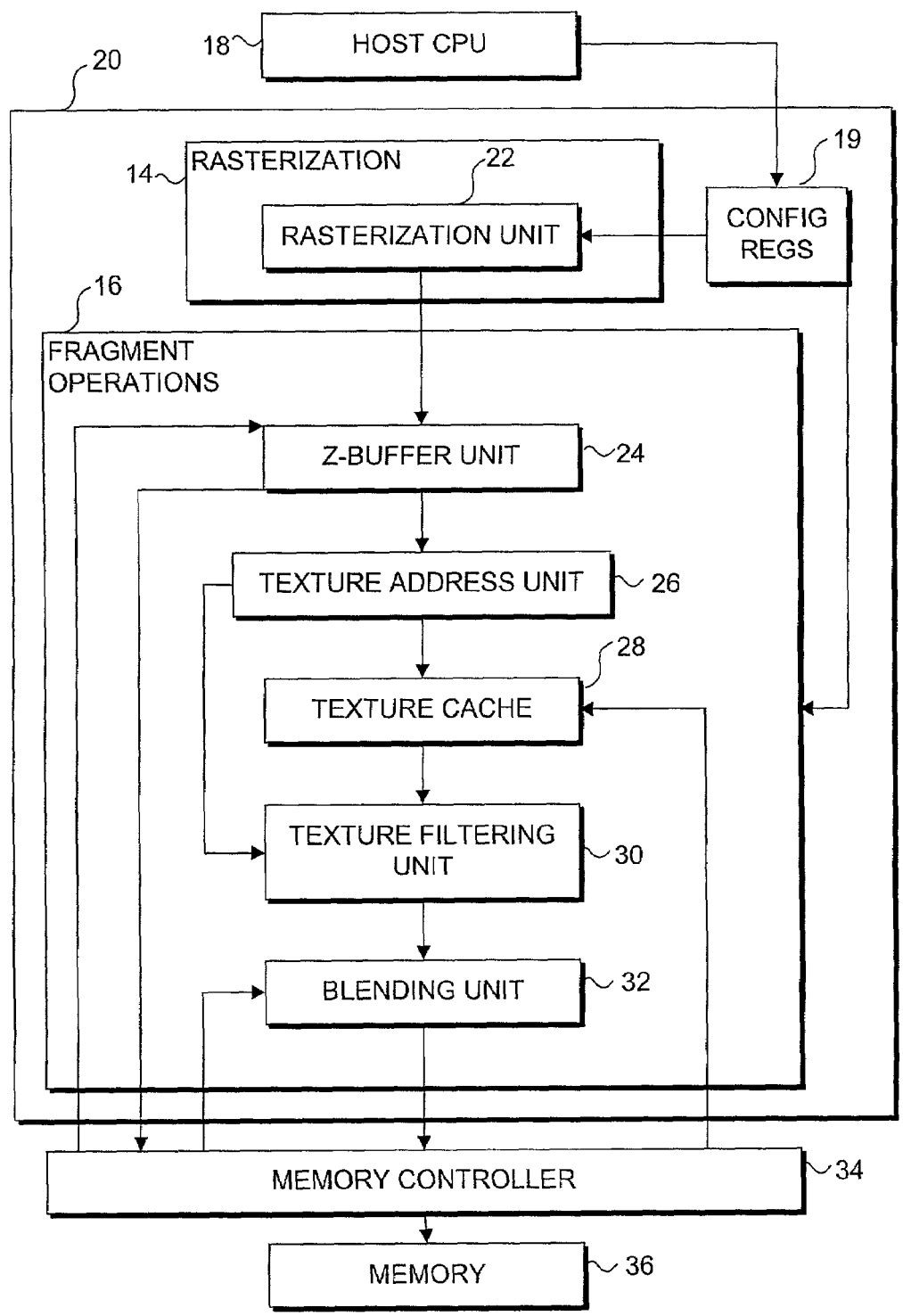
FIG. 2 (prior art) is a block diagram of an exemplary 3D graphics pipeline architecture.

FIG. 2 (prior art) illustrates an exemplary 3D graphics pipeline 20 based on architectures described in the prior art. In accord with Method 2 as discussed above, a host CPU 18 implements API layer 10 and transform/lighting layer 12. Corresponding to results from these layers, host CPU 18 provides a location of program instructions and data access parameters to a set of configuration registers 19 for use by components of a pipeline 20. Pipeline 20 (the architecture used by a graphics processor or other dedicated processing hardware) implements rasterization layer 14 and fragment operations layer 16. Pipeline 20 includes a rasterization unit 22, a Z-buffer unit 24, a texture address unit 26, a texture cache 28, a texture filtering unit 30, and a blending unit 32.

Rasterization layer 14 is optimized for triangle drawing since a triangle primitive can be used for drawing other primitives, such as a dot, a line, a rectangle, and a polygon. Thus, rasterization unit 22 utilizes information from configuration registers 19 to generate x and y output coordinates for each output pixel in a triangle being rendered along a horizontal line, referred to as a scan line. Rasterization unit 22 also generates a z coordinate, which is later converted into a z address by Z-buffer unit 24 to perform depth tests. Rasterization unit 22 further generates texture source coordinates as described below.

Fragment operations layer 16 includes fragment operations performed on the output coordinates. The fragment operations typically comprise coordinate testing, texture mapping, and blending. The first coordinate test is a depth (Z) test. Since 3D objects are displayed on a two-dimensional (2D) screen, the depth output from rasterization unit 22 for a new pixel must be compared with the depth of an old pixel of the same display location, to determine whether the new pixel falls behind or in front of the old pixel. If the new pixel has a depth such that it is behind the old pixel, the new pixel is blocked from view by the old pixel. In that case, the new pixel is hidden and will not be displayed, so there is no need to perform any of the subsequent fragment operations for the new pixel. Z-buffer unit 24 is in communication with rasterization unit 22 and performs the depth test. Z-buffer unit 24 reads the old pixel depth from a memory 36 using a memory controller 34. If the new pixel is in front of the old pixel, Z-buffer unit 24 overwrites the depth of the old pixel with the depth of the new pixel in memory 36, also using memory controller 34.

When the new pixel is in front of the old pixel, the texture mapping fragment operation is performed using texture address unit 26, texture cache 28, texture filtering unit 30, and blending unit 32. Texture mapping adds realism to a computer-generated scene by mapping a texture image onto a surface of an object that is displayed. Since texture mapping is performed on a projected 2D object, it is often necessary to sample texture pixels, referred to as texels, to provide the texture mapped to the surface. Texel sampling may be accomplished via an inverse perspective mapping to determine u and v coordinates within a source texture image that corresponds to the x and y display location coordinates of the new pixel. The well-known equations for computing a texture coordinate are:

$$u = \frac{a_{11}x + a_{21}y + a_{31}}{a_{13}x + a_{23}y + a_{33}}$$

$$v = \frac{a_{12}x + a_{22}y + a_{32}}{a_{13}x + a_{23}y + a_{33}}$$

Host CPU 18 provides the perspective inverse mapping coefficients, a11 through a33. After computing an (x, y) destination coordinate, rasterization unit 22 also computes a corresponding (u, v) inverse-mapped texture source coordinate. The (u, v) inverse-mapped texture source coordinate is passed beyond Z-buffer 24 to texture address unit 26 to determine an address of the (u, v) inverse-mapped texture source coordinate from a single source of texture data.

A more sophisticated method of texel sampling, called multum in parvo (MIP) mapping, uses multiple texture images representing various depths. "Multum in parvo" is Latin for "many in a small place." Each texture image is called a MIP map, and each MIP map is half the size of the previous one, thereby providing several texture images that represent various levels of perspective depth. Generating each half-size MIP map, a process referred to as "minification," is done separately from the 3D graphics pipeline, and each MIP map is stored in memory for later access.

A (u, v) inverse-mapped texture coordinate resulting from texel sampling does not usually correspond exactly with an individual texel in one source texture image. Instead, the texture coordinate resulting from texel sampling normally falls between a number of adjacent texels. For example, the texture coordinate might likely fall between four texels in a source texture image. When multiple source texture images are used (multiple MIP maps), the inverse-mapped texture coordinate also usually falls between four more texels in a second texture image, and falls at a depth that is between that of the two texture images. Thus, it is necessary to determine a texture value at an inverse-mapped texture coordinate, based on texture values of the surrounding texels. A simple method for determining the texture value of the inverse-mapped texture coordinate is to select the texture value of the nearest texel. However, a more accurate method is to interpolate a texture value from the texture values of the surrounding texels. This, interpolation, also known as filtering, is performed by texture filtering unit 30.

There are a number of interpolation methods that can be used for this purpose. A common method is bilinear filtering, whereby four surrounding texels of one texture image are used as a 2×2 texture block in an weighted average computation to interpolate a texture value at the mapped texture coordinate. As discussed in more detail below, the weighted average computation multiplies texture color values (e.g., red, green, blue, and alpha) by interpolation distance coefficients and adds the multiplication products, by texture color value, to produce each interpolated texture color value applied to the final texture value.

Another popular filtering method is trilinear filtering, which is used in conjunction with MIP mapping. In trilinear filtering, eight surrounding texels (four from each of two MIP maps) are used as two 2×2 texture blocks in a weighted average computation to interpolate and determine a texture value at the inverse-mapped texture coordinate.

Texture address unit 26 generates all required texture addresses within each MIP map based on the filtering mode. For example, texture address unit 26 generates four 32-bit red-green-blue-alpha (RGBA) texel addresses for bilinear filtering and eight 32-bit addresses for trilinear filtering. Each color component is represented with 8 bits, so red, green, blue, and alpha color components result in 32 bits for each texel. Texture address unit 26 also generates filter coefficients used in the weighted average computations. Texture address unit 26 further performs texture padding, including clamping, wrapping, and mirroring, as defined in graphics standards, such as OpenGL and Microsoft Corporation's DirectX™ standard.

Texture cache 28 is in communication with texture address unit 26 and is used to temporarily store prefetched texture data. Prefetching reduces latency in loading texture data from memory 36 via memory controller 34. Preferably, texture cache 28 provides multiple ports to load the required texels every cycle. For example, texture cache 28 may provide eight 32-bit read ports for trilinear filtering of 32-bit RGBA texels. Since a multi-port texture cache is expensive and slow, texture cache 28 is sometimes organized as a 2-level cache having a small, multi-ported cache (called a line buffer) and a larger, single-ported cache. Micron Corporation's Model V4400™ 3D graphics processor provides such a 2-level cache.

Texture filtering unit 30 is in communication with texture cache 28 and performs bilinear or trilinear filtering on texture data loaded from the texture cache. The texture data comprised of source texels can be in a compressed format, such as 16-bit RGBA. Thus, before filtering begins, source texels are converted to RGBA 32-bit format pixels and rearranged so that all four red components are adjacent, all four green components are adjacent, all four blue components are adjacent and all four alpha components are adjacent each other. Then, for example, in order to produce one trilinear-filtered pixel per cycle, 256-bit data are processed as two sets of four 32-bit RGBA texels. As indicated above, the filtering involves a weighted average computation, which involves a number of steps. First, eight 32-bit RGBA texels are multiplied by corresponding filter coefficients (e.g., interpolation distances in x and y directions that are essentially percentage distances between the texture coordinate and each texel and not to be confused with inverse mapping coefficients). The results are accumulated for each color component. Finally, the four results are combined, producing one 32-bit RGBA output. To accomplish these steps, texture filtering unit 30 requires computing resources such as multipliers and accumulators. Significantly, the computing resources of texture filtering unit 30 are general computing resources and are usable for other purposes. As discussed below with regard to FIG. 3, the present invention exploits these general computing resources.

Blending unit 32 of FIG. 2 is in communication with texture filtering unit 30 and combines the filtered (interpolated) texture data with other color values, producing, for example, fog and specular effects, and constant colors. Blending unit 32 then blends the combined result with an existing destination pixel value. Other fragment operations, such as alpha test and logical operations, are also performed by blending unit 32. The output of blending unit 32 is passed to memory controller 34.

Architectural Extensions for Media Processing

Real-time imaging and video processing require efficient data access and powerful processors. Although a parallel architecture is optimal for media processing, the real-time texture mapping aspects of the 3D graphics pipeline discussed above may be utilized for accessing data and processing algorithms needed for images and video. For example, image warping algorithms, such as rotation, scaling, shearing, flipping, and translation, map image data to a new display location. Specifically, image warping uses inverse mapping and interpolation, such as bilinear filtering. Such image warping algorithms are similar to inverse-mapping texture data to a display location, as is done in 3D graphics. TABLE 1 below lists other embedded features of a 3D graphics pipeline and their possible uses in imaging and video processing algorithms.

TABLE 1

| Graphics Pipeline Features | Media Processing Algorithms | | | | | | |
|---|---|---|---|---|---|---|---|
| | Point Operations | Convolution | Affine Warp | FFT | DCT | Motion Estimation | Motion Compensation |
| Perspective Address Generation | X | X | X | X | X | X | X |
| Texture Padding | | X | X | | | X | X |
| Filter Coefficient Generation | | | X | | | X | X |
| Multiple Data Loads in Different Locations | X | X | X | X | X | X | X |
| Bilinear/Trilinear Interpolation | | | X | | | X | X |

As TABLE 1 indicates, the ability of a 3D graphics pipeline to perform multiple data loads in different locations can be employed for most media processing algorithms, including Fast Fourier Transforms (FFT) and Discrete Cosine Transforms (DCT). Perspective address generation can also be utilized in all of the media processing algorithms. Texture padding can be used for media filtering operations, such as convolution and half-pixel (half-pel) motion estimation/compensation. Thus, in the prior art, it is possible to perform at least some imaging and video processing, as well as 3D graphics processing, on the same processing platform.

However, the 3D graphics pipeline is optimized to access perspective inverse-mapped 32-bit RGBA data. In contrast, imaging and video processing extensively uses 8-bit and 16-bit data. To change the fixed 3D graphics pipeline to a flexible computing engine for imaging and video processing, extensions are needed for data access and computing. With regard to data access, rasterization unit 22, Z-buffer unit 22, texture address unit 26, and texture cache 28 must be extended to efficiently transfer multiple partitioned 8-bit and 16-bit data, as well as 32-bit data. In addition, more flexible data accesses are needed, since 3D graphics data access patterns are limited by the perspective address generation. With regard to computing, texture filtering unit 30 must be converted to a programmable processing unit, so that other arithmetic operations can be performed, in addition to the weighted average computations of texture filtering.

First Preferred Embodiment

Figure 3:
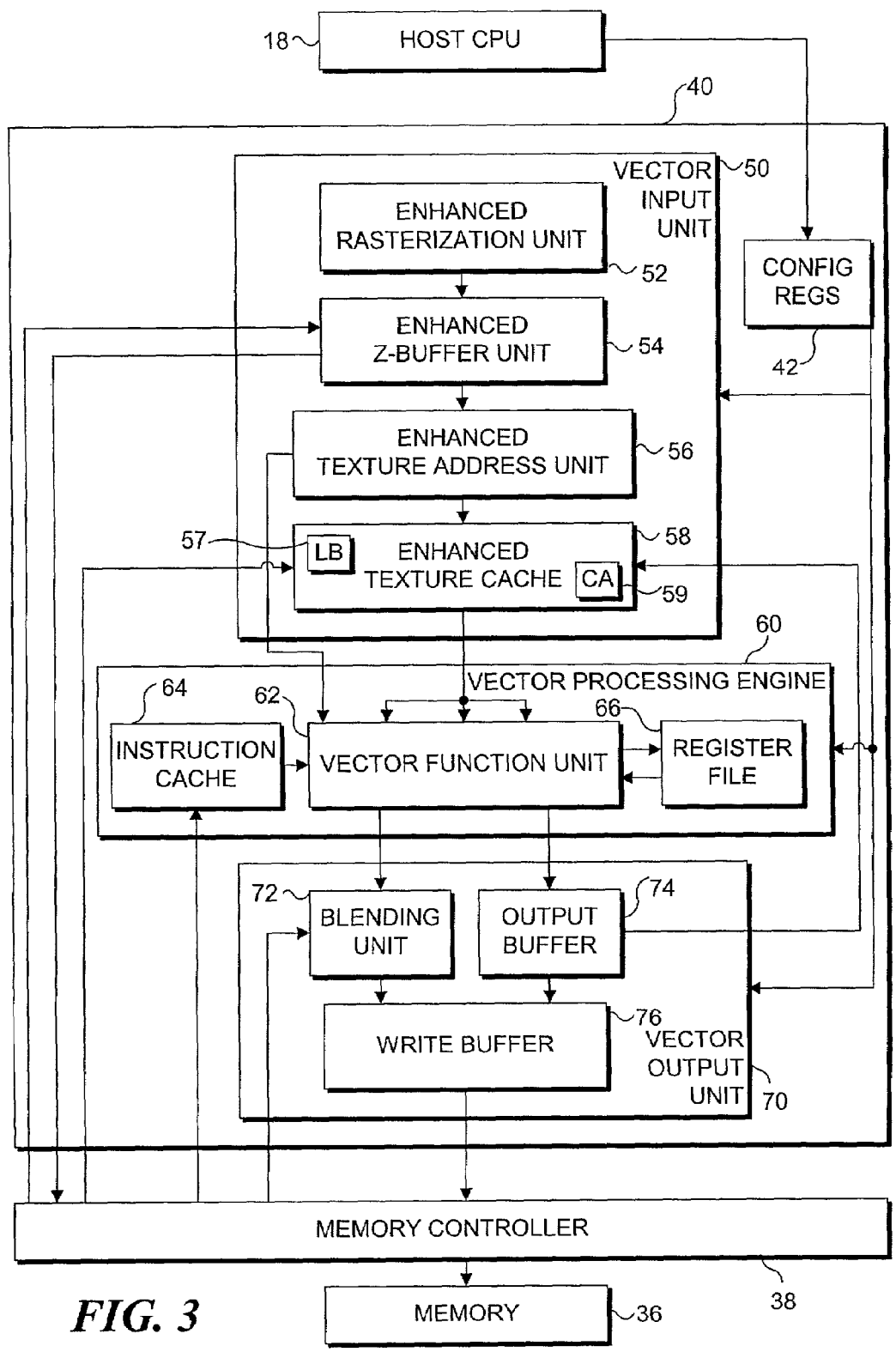
FIG. 3 is a block diagram of a first preferred embodiment of the present invention.

FIG. 3 illustrates a first preferred embodiment of the present invention, providing a unified architecture that represents a substantial extension of the exemplary prior art 3D graphics pipeline of FIG. 2. In FIG. 3, a unified pipeline 40 provides the data access and computing capabilities needed for both 3D graphics processing and other media processing. Extended data access capabilities are provided by a vector input unit 50 and a vector output unit 70. These two units comprise a vector streaming engine (VSE). Extended computing capabilities are provided by a VPE 60 that is connected in communication with the VSE. Vector input unit 50, VPE 60, and vector output unit 70 are also in communication with configuration registers 42, which are set by host CPU 18 with a location of program instructions to be executed and with data access parameters that determine what size and type of data that unified pipeline 40 should process.

Vector Streaming Engine

In general, since 8-bit and 16-bit data are extensively used in imaging and video processing, as well as 32-bit data, the data access units are modified to transfer multiple groups of 8-bit data. Groups of 8-bit data can be used for 16-bit or 32-bit data by combining multiple groups of 8-bit data. In addition, 256-bit data can be provided to VPE 60 in other multiple partitions, such as 32 8-bit partitions, 16 16-bit partitions, or 8 32-bit partitions, as appropriate for the type of multimedia data being processed. To efficiently handle the multiple partitioned data, the rasterization unit, Z-buffer unit, texture address unit, and texture cache comprising vector input unit 50 are modified compared to the corresponding components of the prior art. In addition, a separate wide output path to a memory controller 38 is included for processing media data in vector output unit 70. Preferably, this wide output path enables transfer of 256 bits. The VSE is referred to by that term, because it can gather multiple groups of 8-bit data in different locations, send them as one vector to VPE 60, and transfer the wide output (i.e., 256 bits) to memory 36. A more detailed description of the extensions to the 3D graphics pipeline follows.

As described above, the prior art rasterization unit generates a single destination coordinate at a time for a triangle that is being rendered (sometimes referred to as an output coordinate) based on configuration data set by host CPU 18 in configuration registers 42. In the present invention, an enhanced rasterization unit 52 generates up to 32 destination coordinates at a time, preferably in a compressed format to reduce the number of connections or data paths required. The compressed format for destination coordinates includes one specific destination coordinate and a single value indicating a number consecutive coordinates following the specified destination coordinate. The compressed format of the destination coordinates is preferably later used by vector output unit 70 to generate a 32-bit mask corresponding to the value indicating the number of consecutive coordinates, rather than generating individual destination addresses. The 32-bit mask indicates valid byte locations in a 256-bit output for a memory write transaction. Similarly, enhanced rasterization unit 52 also preferably generates multiple source data coordinates in addition to the above corresponding destination coordinates.

An optional enhanced Z-buffer unit 54, in communication with enhanced rasterization unit 52, can load source coordinates of a triangle (or other primitive) being rendered from its Z-buffer, thereby providing an enhanced texture address unit 56 with flexible data access for the cases where perspective texture address generation cannot cover certain data access patterns, such as a lookup table and reversed-bit ordering in FFT. As with prior art Z-buffer unit 24 (FIG. 2), enhanced Z-buffer unit 54 (FIG. 3) also uses memory controller 38 to read an old pixel from memory 36, and write a new pixel. If the new pixel is in front of the old pixel, enhanced Z-buffer unit 54 updates its Z-buffer and passes the data for the new pixel to enhanced texture address unit 56.

Prior art texture address unit 26 (FIG. 2) typically converts one perspective inverse-mapped texture source coordinate into an absolute address after carrying out a padding operation, such as clamping, wrapping, or mirroring. It also generates filter coefficients for bilinear and trilinear filtering. In contrast, enhanced texture address unit 56 performs the same tasks for multiple source coordinates. Enhanced texture address unit 56 can also generate the addresses of source data in an arbitrary-sized block, in addition to generating a 2×2 block used for texture filtering.

An enhanced texture cache 58, which is in communication with enhanced texture address unit 56, includes a line buffer (LB) 57 and a texture cache area (CA) 59. Preferably, the line buffer provides 32 8-bit read ports. Due to hardware complexity, the line buffer is preferably small in size. For example, the line buffer may have 32 entries, each with an entry size of 32bytes. The line buffer preferably totals 256 bytes, and is organized with a direct-mapped, 32-byte cache line (not separately shown). The line buffer is connected to the texture cache area, which is preferably single-ported and large in size, such as 32 kilobytes. In addition, the texture cache preferably totals 32 kilobytes, and is organized with a 4-way set associative, 32-byte cache line.

Once VPE 60 completes its processing, data are passed to vector output unit 70 of the VSE. Output from VPE 60 can be in different sizes, depending on an instruction used to control the operation. For example, the VPE output may be two 8-bit data streams, or one 256-bit data steam, or data streams of other sizes between 8-bit and 256-bit data If the VPE output is 32-bit graphics data, the data are optionally passed to a blending unit 72 and blended as discussed above for 3D graphics processing.

However, for wide data output used extensively in multimedia processing, the data are optionally passed to an output buffer 74, included in output unit 70. For appropriate sizes of media data, output buffer 74 is used to concatenate partial output from VPE 60 before carrying out any write transactions. This concatenation makes write transactions more efficient. Output buffer 74 is also connected back to enhanced texture cache 58 for facilitating operation of algorithms, such as FFT, that reuse intermediate output as an input. Output buffer 74 further generates output memory addresses from the compressed format of destination coordinates produced by enhanced rasterization unit 52 above.

Concatenated 256-bit data, or other media output data are sent to an optional write buffer 76, which queues the write transactions and bursts several write transactions at once to memory controller 38 to reduce the number of dynamic random access memory (DRAM) page misses. Bursts of write buffer 76 are also used to send blended output from blending unit 72 to memory controller 38. Preferably, write buffer 76 includes several entries with configurable start and stop watermarks. Write buffer 76 preferably communicates through memory controller 38 to memory 36, which is preferably a synchronous dynamic random access memory (SDRAM) with 8-byte width, 2-kbyte page and four banks. Preferably, memory 36 runs at a clock speed of 100 MHz or faster.

Vector Processing Engine

Texture filtering unit 30 of the prior art 3D graphics pipeline shown in FIG. 2 is preferably replaced in the present invention with a VPE 60 that is programmable (shown in FIG. 3). In addition to bilinear and trilinear filtering, VPE 60 enables other operations, such as arithmetic operations, logic operations, and inner product operations with variable size partitions. VPE 60 comprises a 256-bit vector functional unit (VFU) 62, an instruction cache 64, and a register file 66.

VFU 62 is preferably at least a 200 MHz, 64-bit processing unit, such as that of the Hitachi/Equator MAP™ processor discussed above. In addition to an execution unit (not shown), VFU 62 may include an instruction fetch unit (not shown) to request new instructions and store the requested instructions in instruction cache 64. VFU 62 may further include a branch unit (not shown) that provides zero-cycle branches via predefined code block information to reduce the overhead of managing loops and to preserve original rendering throughput. Preferably, a loaded instruction is sent to an instruction decode unit (not shown) within VFU 62 where required source operands are loaded from queues or registers. VFU 62 receives texture data source inputs through several queues of enhanced texture cache 58. In addition, VFU 62 receives filter coefficients as input from enhanced texture address unit 56. VFU 62 may further receive data from a register in register file 66 or send data to a register in register file 66. Based on the mode indicated by data access parameters in configuration registers 42, VFU 62 provides output data either to blending unit 72 for 3D graphics or to output buffer 74 for wide data output, such as for video processing. In the case of the output buffer, the destination could be specified either to be the texture cache or the memory.

Register file 66 comprises several 256-bit registers, mostly used for storing intermediate values and/or for software pipelining. Two consecutive even-odd 256-bit register pairs can be combined to become a 512-bit register for the filter coefficient source, providing 32 16-bit coefficient data.

While the additional computing power of VPE 60 enables multimedia processing, the architecture does not slow the rendering throughput for 3D graphics. Several mechanisms sustain the throughput when rendering graphics. First, 3D graphics performance is not adversely affected by VPE 60, since VFU 62 requires only one instruction to handle all required texture filtering (e.g., inner product instruction). Second, the input/output data are delivered through queues, which removes the need for separate load/store instructions. Third, the interpolation factor is automatically computed by enhanced texture address unit 56 and fed to VFU 62.

Data Transfer Options of VSE

Further detail is now provided with regard to data transfer options provided by the vector streaming engine of the preferred architecture described above. TABLE 2 below, lists the data transfer options.

TABLE 2

| Item | Option | Description |
| --- | --- | --- |
| Inverse Mapping | Perspective | Source addresses are generated in the texture address unit. |
| | Indirect | Source addresses are loaded from Z-buffer. |
| Access Pattern | Normal | Data are loaded as they are in the memory. |
| | Bilinear | Each 32-bit RGBA pixel is split and four 8-bit data for each color component are gathered. |
| | Trilinear | Two 32-bit RGBA pixels from two textures are split and eight 8-bit groups of data for each color component are gathered. |
| Data Element Size | 8, 16, or 32 bits | Each data element can be in either 8, 16, or 32 bits. |
| Block Size | Arbitrary | Block size may be 1 × 1 to N × M where N and M are the maximized horizontal and vertical sizes allowed. |

Inverse mapping is handled in either a perspective addressing mode or an indirect addressing mode. In the perspective addressing mode, source addresses are calculated. In the indirect addressing mode, the source addresses are loaded from the Z-buffer. Access patterns include normal, bilinear, and trilinear. In the normal pattern, the above preferred architecture provides normal consecutive accesses, wherein the data are loaded in the order that they are stored in the memory. In bilinear and trilinear patterns, color components in the loaded data are split and rearranged into four sets of RGBA data, as for 3D graphics.

Figure 4:
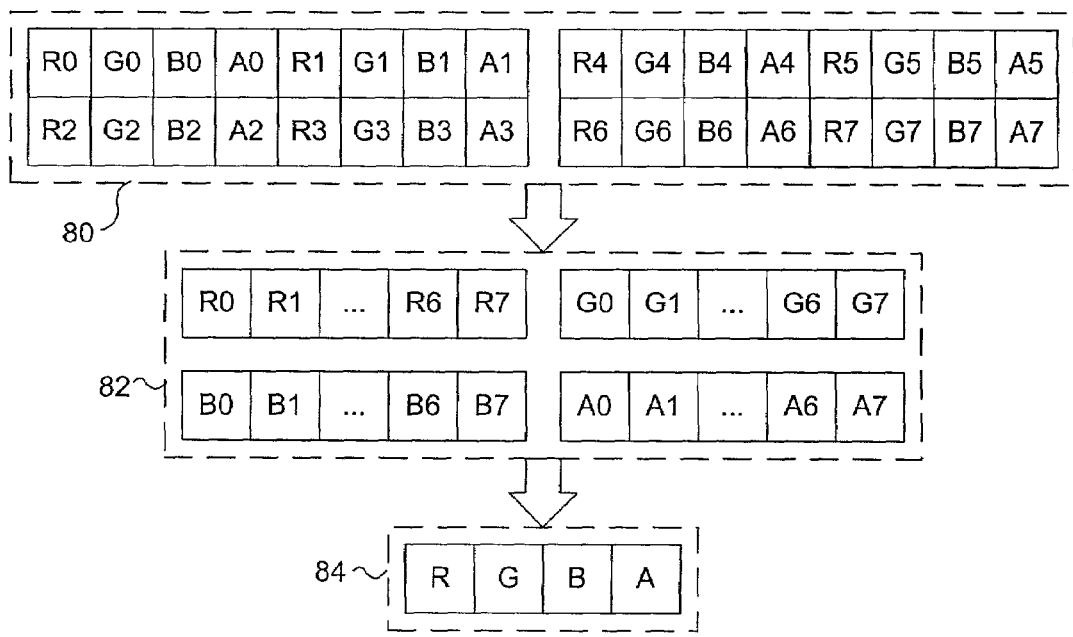
FIG. 4 is a schematic diagram illustrating an exemplary data transfer operation of the first preferred embodiment for texture filtering, wherein a trilinear access mode is used for processing 3D graphics data.

FIG. 4 illustrates an example data transfer operation of the above preferred architecture for texture filtering where the trilinear access mode is used for processing 3D graphics data through the unified pipeline described above. In general, data transfer includes three stages. The first stage is data in the memory. The second stage is data as loaded and rearranged for input to the vector functional unit. The third stage is the output of the vector functional unit. In the trilinear mode, two 2×2 32-bit RGBA blocks are loaded from memory, where they appear as shown at a stage 80. Each of the eight 32-bit RGBA pixels is then split into the red, green, blue, and alpha color components in the enhanced texture cache. Four groups of 8-bit data for each color component are rearranged in the enhanced texture cache and appear as shown at a stage 82. Finally, a 32-bit RGBA pixel is produced by the vector functional unit with a 4-partitioned inner product operation (eight 8-bit elements in each partition) described below. The resulting pixel data are as shown at a stage 84.

Figure 5:
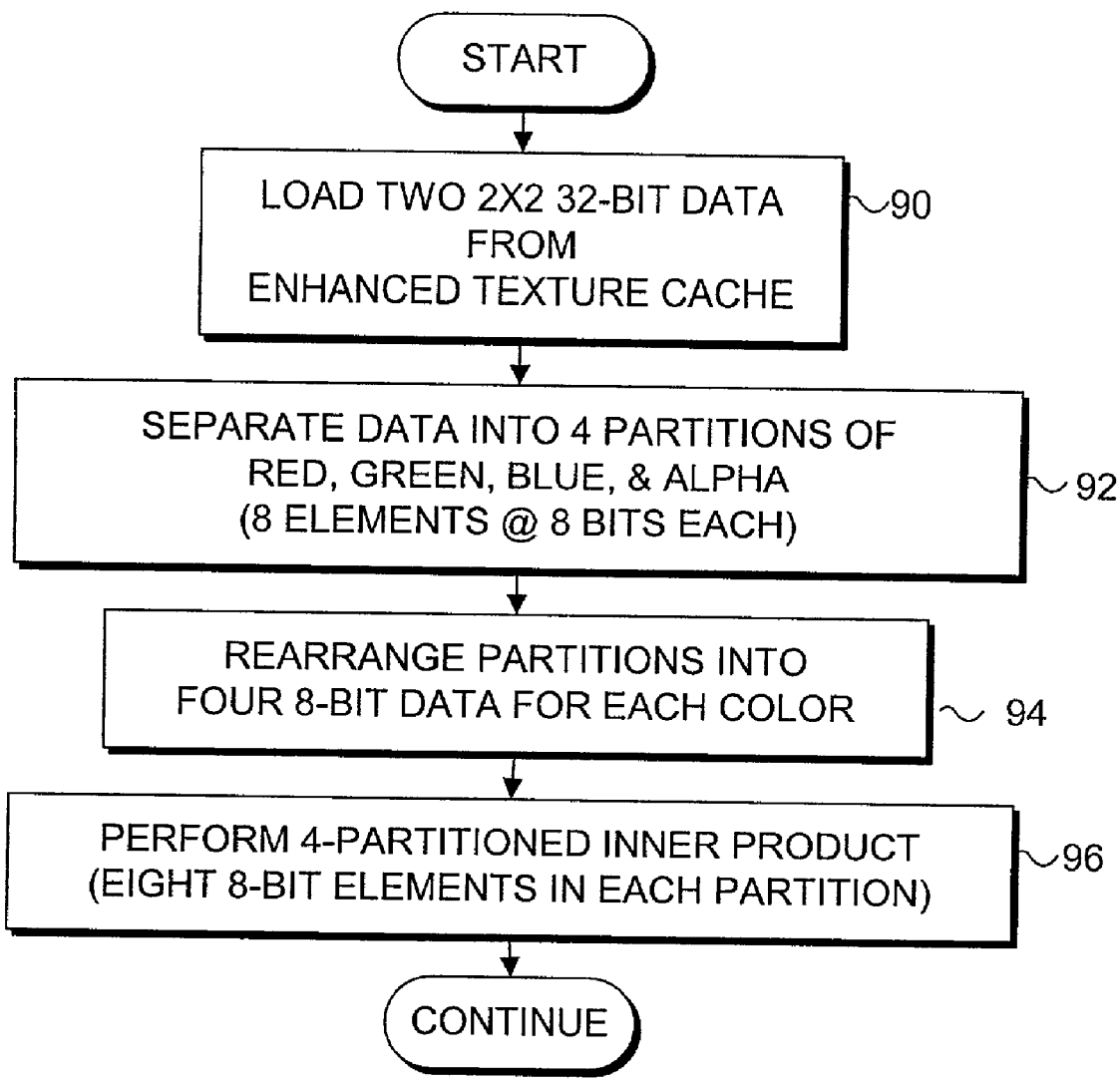
FIG. 5 is a flow diagram illustrating logic employed in the data transfer operation of FIG. 4.

FIG. 5 is a flow diagram illustrating the logic of the data transfer operation of FIG. 4 and texture filtering, where the trilinear access mode is used. At a step 90, two 2×2 32-bit RGBA blocks are loaded from the enhanced texture cache. Each of the eight 32-bit RGBA pixels is split into red, green, blue, and alpha color components by the enhanced texture cache, at a step 92. The components are then rearranged in the enhanced texture cache into four groups of 8-bit data for each color component, at a step 94. Finally, the VFU performs a 4-partitioned inner product operation (eight 8-bit elements in each partition) as described below, at a step 96, to produce the 32-bit RGBA pixel.

Other examples of data transfer options in TABLE 2 can be briefly described. Image convolution uses an 8-bit normal mode with a block size of 4×4. Two overlapped 4×4 blocks are loaded at the first stage. A 256-bit input vector is formed at the second stage. Then, a 2-partitioned inner product operation (16 8-bit elements in each partition) is applied by the VPU to generate two groups of 8-bit data at the third stage.

Point operations, such as image inverting, use the 8-bit normal mode with a block size of 1×1. In this case, 32 consecutive 8-bit data are loaded at the first stage. Those data are fed to the vector functional unit for the second stage. Since a point operation is performed on each 8-bit data, the vector functional unit generates one 256-bit output at the third stage. For an 8-bit indirect mode, 256-bit offset data (e.g., A0 . . . A31) are loaded from the Z-buffer for the first stage. Next, 32 8-bit data (e.g., D0 . . . D31) are guided by the offset data for the second stage. Finally, 32 8-bit data (e.g., X0 . . . X31) are output at the third stage.

To make memory accesses efficient for the data transfer operations, a prefetching technique is also applied to the preferred architecture described above. Memory access efficiency is dependent on two factors: bandwidth and latency. Bandwidth relies on the memory bus width and bus operation frequency, whereas latency depends on both memory access behavior and memory controller efficiency, as well as DRAM row access time. Non-blocking caches and data prefetching techniques have been used in general-purpose processors to reduce the memory latency. The idea is to increase the gap between the time that data are loaded and the time that the data are used, to prevent the processor from stalling. Non-blocking caches allow execution to proceed with cache misses until the missed data are actually needed, whereas prefetching attempts to increase the time gap between load and use of the data by generating a memory transaction earlier. These prefetching techniques have also been applied to 3D graphics pipelines. To increase the load-use gap and enable the fragment data in the graphics pipeline to proceed with cache misses, several null-pipe stages are inserted between the tag check and the data receive stages in the texture cache. In this case, the maximum number of consecutive cache misses allowed is the number of null-pipe stages inserted. The present invention applies this prefetching technique to a 2-level cache of the enhanced texture cache. In addition, memory access efficiency is further improved by setting proper watermarks of the write buffer, which could reduce the number of DRAM page misses significantly in case of consecutive accesses of the data.

VPE Instruction Set

Further detail is now provided with regard to the steps carried out by the VPE of the preferred architecture described above. To accomplish both 3D graphics processing and media processing, a set of instructions are provided. These instructions fall into four groups: (1) partitioned inner product instructions; (2) partitioned arithmetic and logical instructions; (3) data movement instructions, and (4) loop-control instructions. TABLE 3 summarizes example instructions provided in the preferred architecture described above.

TABLE 3

| Instruction | Description |
| --- | --- |
| pinnerprod16_rs.u8.u8.s16 | Partitioned inner product (16 8-bit elements in each partition) (e.g., for 2D convolution) |
| pinnerprod8_rs.u8.u8.s16 | Partitioned inner product (8 8-bit elements in each partition) (e.g., for trilinear texture filtering) |
| pinnerprod4_rs.u8.u8.s16 | Partitioned inner product (4 8-bit elements in each partition) (e.g., for bilinear texture filtering) |
| mov (logical instruction) | Move |
| padd_rs.s16 (arithmetic instr.) | 16-bit partitioned add (e.g., for FFT) |
| psub_rs.s16 (arithmetic instr.) | 16-bit partitioned subtract (e.g., for FFT) |
| padd_rs.u8 (arithmetic instr.) | 8-bit partitioned add (e.g., for image add) |
| psub_rs.u8 (arithmetic instr.) | 8-bit partitioned subtract |
| padd_rs.u8.u8.s16 (arithmetic instr.) | 8-bit partitioned add (e.g., for video motion compensation) |
| padd_rs.s16.u8.s16 (arithmetic instr.) | 16-bit partitioned add (e.g., for video motion compensation) |
| pcmpy_rs.s16 (arithmetic instr.) | 32-bit partitioned complex-number multiply (real & imaginaty are in 16 bits each) (e.g., for FFT) |
| pexpand_hi.u16.u8 | Expand 8-bit data in the higher half of a source data element to 16 bits |
| pexpand_lo.u16.u8 | Expand 8-bit data in the lower half of a source data element to 16 bits |
| ppack.u8.u16 | Pack two 16-bit data elements in two sources into 8 bits |
| loop | Hardware loop control |

First, instead of a weighted average computation for 3D graphics data, two inner product instructions, pinnerprod4_rs.u8.u8.s16(src, coef, imm) and pinnerprod8_rs.u8.u8.s16(src, coef, imm), are used for bilinear and trilinear texture filtering, respectively. The three operands are source data (src), filter coefficient data (coef), and right shift distance (imm). As indicated above, the 3D graphics performance is preserved, since texture filtering can be processed with one instruction, which results in a throughput of one trilinear-filtered 32-bit pixel per cycle.

Figure 6:
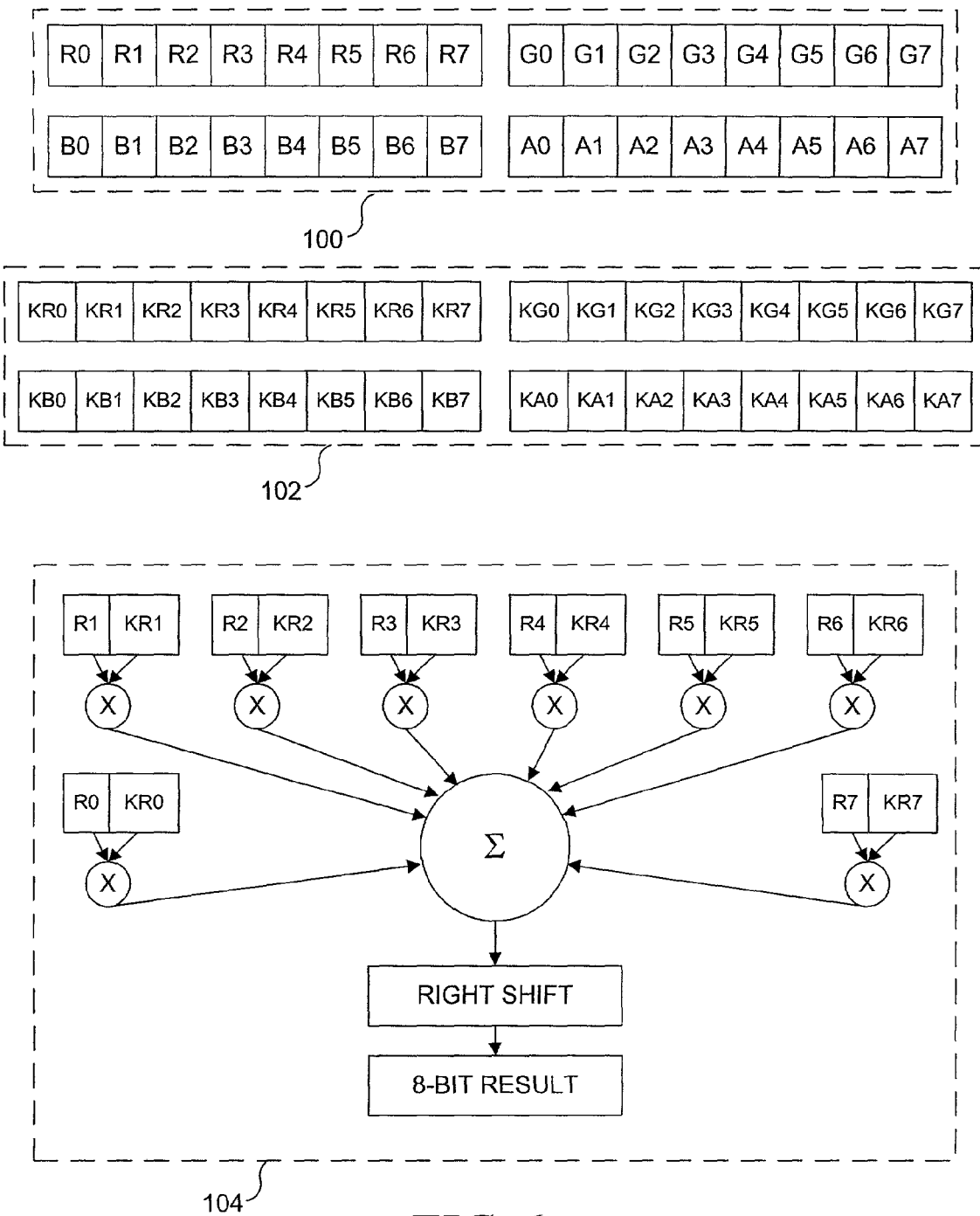
FIG. 6 is a schematic diagram illustrating operation of an inner product instruction for trilinear filtering of 3D graphics data.

As an example, FIG. 6 provides a graphical illustration of the operation of the pinnerprod8_rs.u8.u8.s16(src, coef, imm) instruction for trilinear filtering of 3D graphics data. The first and second operands specify a 256-bit source data (src) 100 and a 512-bit filter coefficient data (coef) 102, respectively. The source and coefficient data are divided into four partitions, specifically red, green, blue, and alpha partitions. The inner product operation 104 is performed on each partition. Explicitly, eight elements (each in 8 bits) of a partition of source data 100 are first multiplied by eight elements (each in 16 bits) of a partition of filter coefficient data 102. The results of each multiplication are then summed. The sum is right-shifted (rs) by the third operand (imm) of the instruction, and the final four 8-bit outputs are concatenated.

Figure 7:
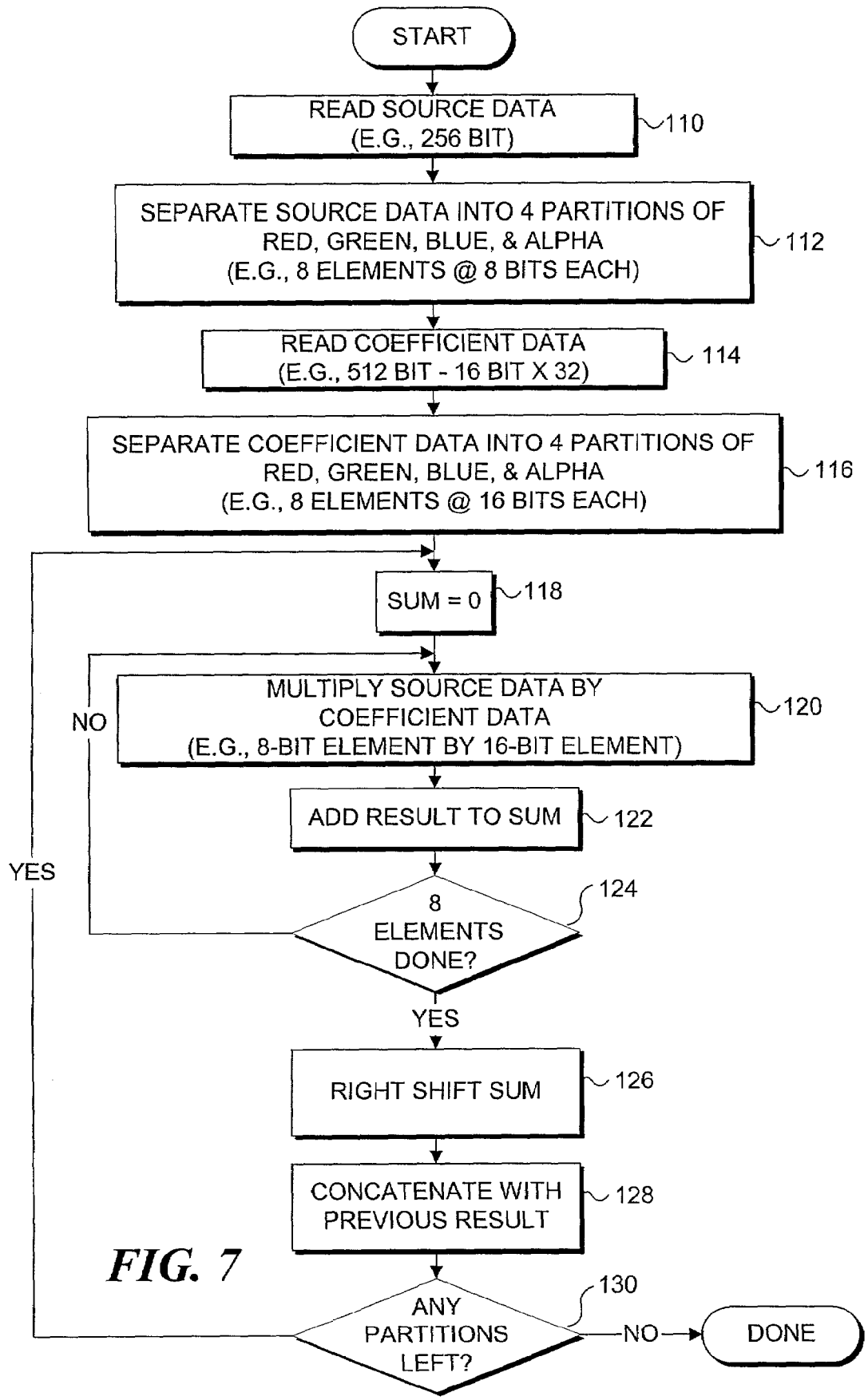
FIG. 7 is a flow diagram of logic used for determining a 4-partitioned inner product.

The above steps for the 4-partitioned inner product are represented in the form of flow diagram in FIG. 7. At a step 110, the VFU accesses RGBA source data in its 256-bit form. Those skilled in the art will recognize that other sizes of source data may be processed in the same manner as described below in the proportions suitable for the desired source and output data. For 256-bit source data, the VFU separates the source data into four partitions of red, green, blue, and alpha data, at a step 112. Each partition comprises eight elements, and each element is 8 bits long. At a step 114, the VFU accesses corresponding filter coefficient data in its 512-bit form (32 16-bit elements). The VFU then separates the filter coefficient data into four partitions, at a step 116. Each partition comprises eight elements, and each element is 16 bits long. At a step 118, a sum is set to zero. At a step 120, the VFU multiplies an 8-bit source data element by a 16-bit filter coefficient data element. The resulting product of the multiplication is added to the sum, at a step 122. At a decision step 124, the VFU determines if eight elements have been processed. If processing of the eight elements has not been completed, the VFU returns to step 120 to multiply the next pair of elements. Once eight pairs of elements have been multiplied and their products summed, the VFU right shifts the sum and saturates the sum to 8-bit data, at a step 126. At a step 128, the saturated sum is concatenated to a previous result (or just stored if no previous result exists). At a decision step 130, the VFU determines whether all four partitions have been completed. If all four partitions have not been completed, the VFU returns to step 118 to reset the sum to zero and perform the inner product on the next partition. When all four partitions are completed and the results concatenated, a single 32-bit pixel is produced.

For 2D convolution of image data, a third inner product instruction, which is defined as pinnerprod16_rs.u8.u8.s16 (src, coef, imm), performs inner product operations on two partitioned data (16 8-bit elements in each partition). Note that the three inner product instructions can be implemented without much overhead based on the texture filtering unit of the base graphics pipeline, since they are similar.

Second, we define partitioned logical and arithmetic instructions for other media processing. Logic instruction mov(src) is a simple operation used to move that source data. Arithmetic instructions padd_rs.s16(src1, src2, imm) and psub_rs.s16(src1, src2, imm) perform 16-bit partitioned add and subtract operations, respectively, followed by right shift by imm, which is used to prevent the result from overflowing. Instructions padd_rs.u8(src1, src2, imm) and psub_rs.u8(src1, src2, imm) are added to the instructions to carryout an image add function and an image subtract function. These functions perform partitioned add or subtract on unsigned 8-bit data. Instructions padd_rs.u8.u8s16 (src1, src2, imm) and padd_rs.s16.u8.s16(src1, src2, imm) are added for video motion compensation. The padd_rs.u8.u8s16(src1, src2, imm) instruction performs a partitioned add on 32 elements, where src1 is in 8 bits and src2 is in 16 bits. The output of each partition of the padd_rs.u8.u8.s16 instruction is saturated to 8 bits. The padd_rs.u16.u8.s16(src1, src2, imm) instruction performs a partitioned add on 16 elements, where src1 is in 8 bits and src2 is in 16 bits. Note, however, that only the lower half data of src1 are used in the pad_rs.u16u8.s16 instruction. The output of each partition of the padd_rs.u16.u8.s16 instruction is saturated to 16 bits.

Instruction pcmpy.rs.s16(src1, src2) performs complex-number multiply on partitioned 32-bit data, each of which represents real and imaginary parts in 16 bits each. The three instructions (padd_rs.s16, psub_rs.s16, and pcmpy.rs.s16) are used for FFT.

Third, we provide example data movement instructions for manipulating partitions of data words. For example, instruction pexpand_hi.u16.u8 expands 8-bit data in the higher half of a source data element to 16 bits. Conversely, instruction pexpand_lo.u16.u8 expands 8-bit data in the lower half of a source data element to 16 bits. To pack two 16 bit data elements in two source data elements into 8 bits, instruction ppack.u8.u16 is used.

Fourth, a loop-control instruction, loop(ID, number of iterations, number of instructions), is provided to remove the overhead of branch instructions in media processing, such as for video compression. The first and second operands of the loop instruction specify the loop controller ID and the number of iterations, respectively. The third operand specifies the number of instructions, which immediately follow the loop instruction, that are to be iterated.

Second Preferred Embodiment

Figure 8:
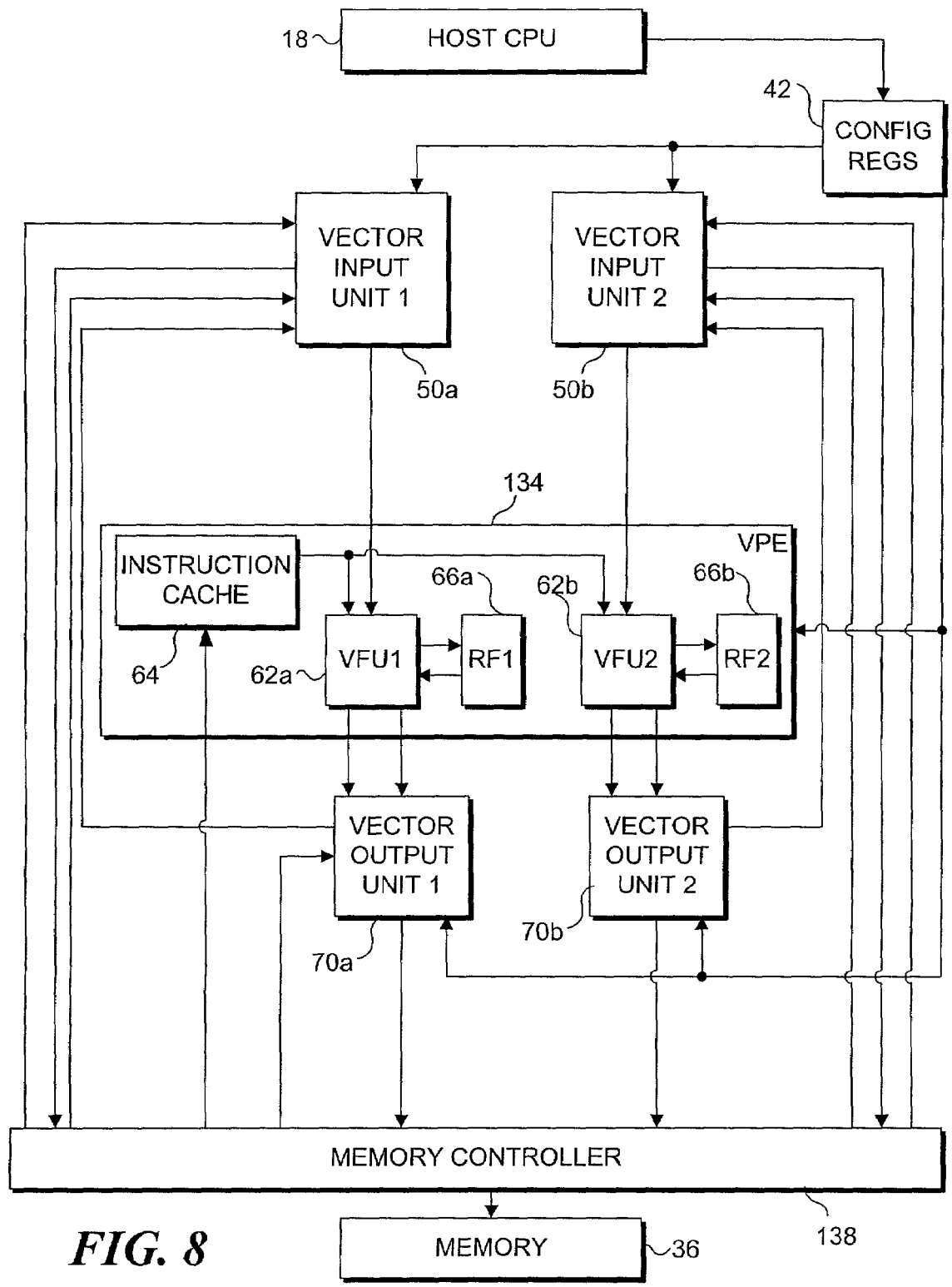
FIG. 8 is a schematic diagram of a second preferred embodiment, which uses two parallel unified pipelines in accord with the first architectural embodiment.

FIG. 8 illustrates a second preferred embodiment, which uses two parallel unified pipelines in accord with the first architectural embodiment described above. Host CPU 18 provides locations of program instructions and data access parameters to configuration registers 42, so that each pipeline performs parallel operations. Configuration registers 42 are arranged with a set of registers for each pipeline.

Within the first pipeline, a first vector input unit 50a provides data to a first vector functional unit (VFU1) 62a. In the second parallel pipeline, a second vector input unit 50b provides data to a second vector functional unit(VFU2) 62b. VFU1 62a and VFU2 62b each have a separate register file. Specifically, a first register file (RF1) 66a is in communication with VFU1 62a, and a second register file (RF2) 66b is in communication with VFU2 62b. However, both vector functional units are in communication with the single instruction cache 64. These vector functional units, register files, and the instruction cache comprise a parallel VPE 134.

Each vector functional unit can provide graphics and wide media output to a vector output unit for blending, concatenating, queuing, or other post processing. Specifically, VFU1 62a provides output data to a first vector output unit (VOU1) 70a. In parallel, VFU2 62b provides output data to a second vector output unit (VOU2) 70b. Each vector output unit may pass intermediate data back to the corresponding vector input unit for further processing, such as for implementing a FFT. Otherwise, each vector output unit passes its final pixel data to a memory controller 138, which stores the pixel data in memory 36. Memory controller 138 can provide individual data access to each vector input unit. An alternative arrangement provides the same data access lines of memory controller 138 to each of the vector input units in a daisy-chained fashion, if appropriate routing control is provided.

It is contemplated that one or more additional pipelines can be included in parallel with the two noted above. Also, many variations can be made, depending on a desired throughput. For example, a multiplexer and/or demultiplexer can be used to direct the data among a plurality of pipelines, or to direct data among various parallel portions of the pipelines.

Exemplary Media Applications

To further aid in understanding the present invention, an image processing example and a video processing example are discussed to show how the invention may be utilized. Specifically, image averaging and motion compensation are described. These applications can be accomplished with a single or a multiple pipeline embodiment, but a single pipeline is used in the description below to simplify the discussion.

Figure 9:
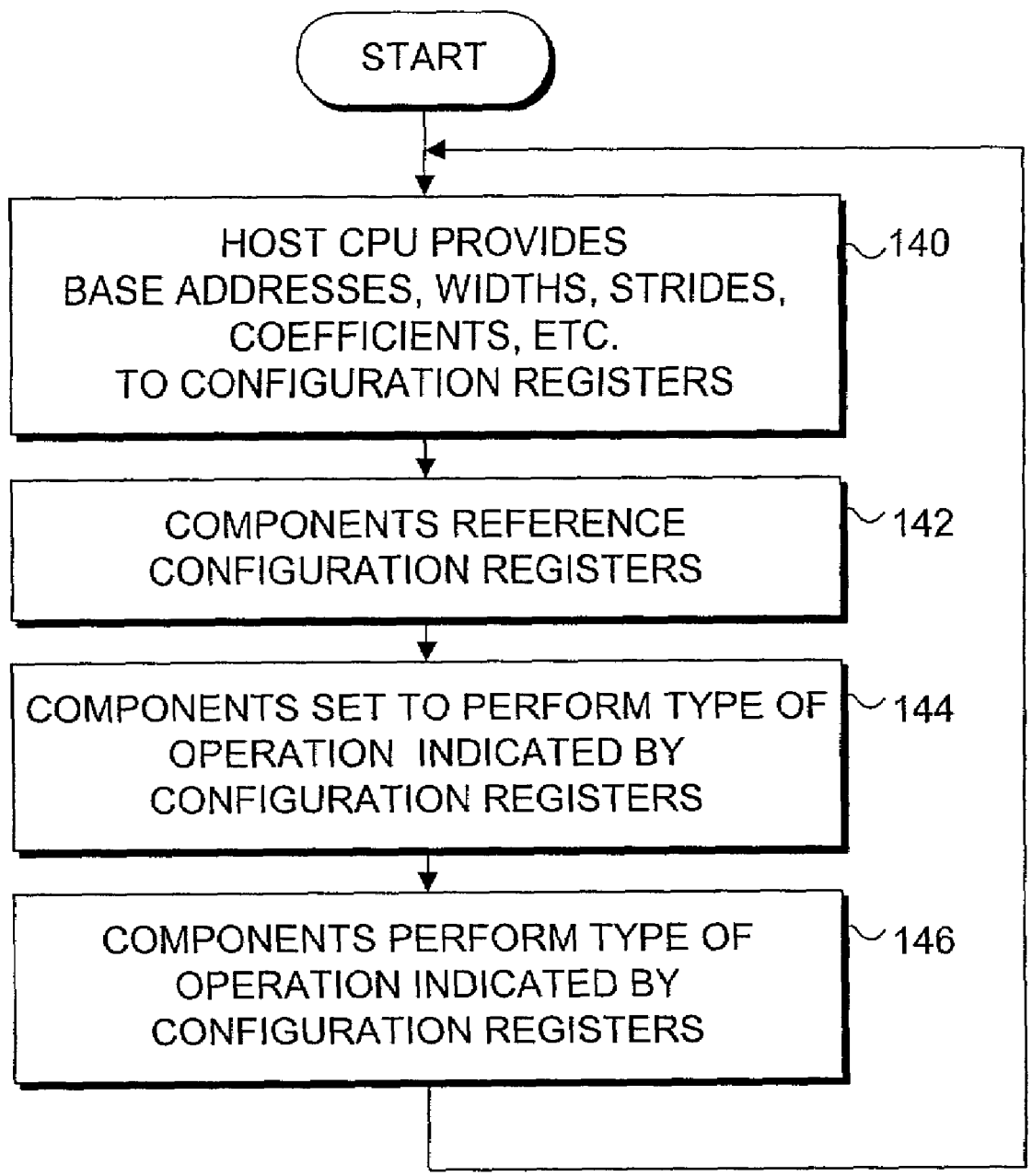
FIG. 9 is a flow diagram illustrating logic for initiating a process with the first embodiment of the present invention.

To begin any type of processing with the present invention, some preliminary information must be provided. FIG. 9 is a flow diagram illustrating logic for initiating processing. At a step 140, the host CPU first provides the configuration registers with one or more data widths, base addresses to source data stored in memory, widths of input and output images, strides (i.e., pitches) of input and output images, heights of input and output images, perspective inverse mapping coefficients, access patterns, instruction addresses, and/or other information that is relevant to the function to be implemented by the process.

As indicated above, each component of the pipeline is in communication with configuration registers that are set by the host processor. Thus, to determine the appropriate type of processing, each component refers to its corresponding configuration register at a step 142. At a step 144, each component determines the type of operation it is to perform and sets itself for performing the determined type of operation. Setting up to perform an operation may include loading a parameter, loading an instruction, etc. The components then perform the type of operation indicated by the configuration registers, at a step 146. The above steps continually repeat.

Once the preliminary information is made available and the type of operating mode is determined, the components of the pipeline can process the data to accomplish the desired function. FIGS. 10A–10D illustrate logical steps implemented for accomplishing image averaging with the single pipeline embodiment of the present invention. These Figures provide exemplary detail for step 146 of FIG. 9. Image averaging is a simple processing function that reads two source images and generates one averaged image by averaging the data for corresponding pixels in the two source images. Source image data are analogous to texture image data of the 3D graphics processing described above. As with graphics texture mapping, the type of mapping is preferably set to perspective inverse mapping with a normal access pattern. Mapping (x, y) destination coordinates to the (u, v) coordinates of the source images is preferably one-to-one, so that the perspective inverse-mapping coefficients are preferably preset to:

$$\alpha_{11}=1, \alpha_{21}=0, \alpha_{31}=0$$

$$\alpha_{12}=0, \alpha_{22}=1, \alpha_{32}=0$$

$$\alpha_{13}=0, \alpha_{23}=0, \alpha_{33}=1$$

Also, each source image is preferably stored in 8-bit data elements. Thus, the data element size is preset to 8 bits, and the block size is simply 1×1. Those skilled in the art will recognize that the input images can be any size (e.g., 512×512).

To begin, FIG. 10A illustrates logic for obtaining coordinates and corresponding memory addresses for the two source images to be averaged. At a step 162, the enhanced rasterization unit generates 32 (u, v) source coordinates for image 0. The enhanced rasterization unit also generates a compressed representation of 32 (x, y) destination (i.e., output) coordinates. Preferably, the enhanced rasterization unit simply generates a single (x, y) destination coordinate representing the first of 32 consecutive destination coordinates. However, the enhanced rasterization unit generates all 32 (u, v) source coordinates. The above processing preferably occurs during a single clock cycle.

Preferably during a subsequent clock cycle, other multiple tasks are performed by various components at the same time, as shown by dashed lines. At a step 164, the enhanced rasterization unit passes the 32 (u, v) source coordinates, for image 0 to the enhanced Z-buffer. The enhanced rasterization unit also passes the compressed 32 (x, y) destination coordinates to the enhanced Z-buffer via a pipeline buffer (not shown). The 32 (x, y) destination coordinates will be passed through the pipeline to the output buffer. No depth check is required by the enhanced Z-buffer, because the image averaging function is not concerned with comparing depths, as is necessary for 3D graphics.

Preferably, during the same clock cycle, the enhanced rasterization unit generates 32 (u, v) source coordinates for the other image, image 1, at a step 166. The enhanced rasterization unit need not generate another compressed representation of the (x, y) destination coordinates, because the two images will be averaged together and output to one set of destination coordinates. However, the enhanced rasterization unit may perform a duplicate generation of the compressed representation of the (x,y) destination coordinates if it is more efficient from the perspective of hardware design and/or operation.

At the next clock cycle, the enhanced Z-buffer passes the 32 (u, v) source coordinates for image 0 to the enhanced texture address unit, shown at a step 168. The enhanced Z-buffer also passes the compressed 32 (x, y) destination coordinates to the enhanced texture address unit. Preferably during the same clock cycle in which the Z-buffer is passing the coordinates, the enhanced texture address unit also converts the (u, v) source coordinates for image 0 into 32 addresses at which image 0 source data are stored, at a step 170. Specifically, the enhanced texture address unit multiples the v coordinate by a memory stride (i.e., pitch) that is preset in the configuration registers. To this product, the enhanced texture address unit adds the u coordinate and a base address for image 0 that is also preset in the configuration registers. This computation is similar to generating memory addresses where texture data would be stored for 3D graphics processing. Also preferably during the same clock cycle, the enhanced rasterization unit passes the 32 (u, v) coordinates for image 1 to the enhanced Z-buffer, at a step 172. Those skilled in the art will recognize that duplicate compressed outputs coordinates may also be passed to the enhanced Z-buffer if it is more efficient from the perspective of hardware design and/or operation. Control then passes to a step 174 of FIG. 10B, via a connector A.

FIG. 10B illustrates continued logic for obtaining coordinates, corresponding memory addresses, and image data for the two source images to be averaged. At a step 174, the enhanced texture address unit passes the 32 addresses where the image 0 source data are stored to the enhanced texture cache. Similar to steps above, the enhanced texture address unit also passes the compressed 32 (x, y) destination coordinates to the enhanced texture cache on their way to the output buffer.

At a decision step 176, the enhanced texture cache determines whether the image 0 source data are already in the enhanced texture cache as a result of previous processing. If the image 0 source data are not already available in the internal data cache area of the enhanced texture cache, the enhanced texture cache retrieves the image 0 source data from the 32 addresses in main memory and puts the data into the internal data cache area, at a step 178. Once the image 0 source data are available in the internal data cache area, the enhanced texture cache loads the image 0 source data from the internal data cache area to an internal line buffer, at a step 180. Obtaining and loading the image 0 source data may take multiple clock cycles, depending on whether the image 0 source data are already available in the internal data cache area.

At a step 182, the enhanced texture cache passes the image 0 source data to a queue 0 of the VFU. As above, the enhanced texture cache also passes the compressed 32 (x, y) destination coordinates to the VFU on their way to the output buffer. During the same clock cycle, the enhanced Z-buffer passes the 32 (u, v) coordinates from image 1 to the enhanced texture address unit, at a step 184. While the Z-buffer is passing the (u, v) coordinates, the enhanced texture addresses unit converts the (u, v) coordinates for image 1 into 32 addresses in main memory where the image 1 source data are stored, at a step 186. This step implements the same computation described above, in regard to step 170. Control then passes to a step 188 of FIG. 10C via a connector B.

FIG. 10C illustrates continued logic for obtaining coordinates and corresponding memory addresses for the second source image, and for computing the image average by the vector functional unit. At step 188, the enhanced texture address unit passes the 32 addresses where the image 1 source data are stored to the enhanced texture cache.

At a decision step 190, the enhance texture cache determines whether the image 1 source data are already in the enhanced texture cache as a result of some previous processing. If the image 1 source data are not already available in the internal data cache area of the enhanced texture cache, the enhanced texture cache retrieves the image 1 source data from the 32 addresses in main memory and puts the data into the internal data cache area, at a step 192. Once the image 1 source data are available in the internal data cache area, the enhanced texture cache loads the image 1 source data from the internal data cache area to an internal line buffer, at a step 194. As above, obtaining and loading the image 1 source data may take multiple clock cycles, depending on whether the image 1 source data are already available in the internal data cache area.

At a step 196, the enhanced texture cache passes the image 1 source data to a queue 1 of the VFU. At a step 198, the VFU adds each 8-bit partition of queue 0 and queue 1 together and then right shifts the sum by one to compute the average image data. At a step 200, the VFU passes the resulting average values to the output buffer. The VFU also passes the compressed 32 (x, y) destination coordinates to the output buffer. Control then passes to a step 202 of FIG. 10D via a connector C.

FIG. 10D illustrates continuing logic for output of average image data values to main memory. At step 202, the output buffer concatenates the 32 8-bit average values into 256-bit wide data. The output buffer also generates a compressed output address and an address mask from the compressed 32 (x, y) destination coordinates. The output address and address mask identify where the output average values will be stored in main memory. Those skilled in the art will recognize that other components above may generate the output address and mask if it is more efficient for hardware design and/or operation. At a step 204, the output buffer passes the concatenated values to the write buffer. The output buffer also passes the compressed output address and mask to the write buffer. At a step 206, the write buffer stores the concatenated values and the compressed output address and mask. At a decision step 208, the write buffer determines whether a start watermark has been reached. The start watermark is a predefined number of entries that must be received before the write buffer will begin writing the data to main memory. Preferably, the start watermark is set to four. If less than four entries of 256-bit data have been passed to the write buffer, control returns to step 206 to await storing another entry of 256-bit data. Once the start watermark has been reached, the write buffer bursts the concatenated data to main memory at the addresses identified by the compressed output address and mask through the memory controller, at a step 210. At a decision step 212, the write buffer determines whether a stop watermark has been reached. The stop watermark is a predefined number of entries at which the write buffer will stop sending data to the main memory. Preferably, the stop watermark is set to zero, so that the write buffer sends all data that it contains to the main memory before stopping. If the stop watermark has not been reached, control returns to step 210 to burst more data to the main memory. Once the stop watermark is reached, control returns to step 206 to await more data.

The above processing is described for a single pipeline embodiment, whereby 32 8-bit input data are loaded in the single pipeline. However, in the case of two parallel pipelines, two 256-bit VFUs together can generate 64 8-bit pixels per cycle. By comparison, two parallel pipelines of the prior art 3D graphics pipelines can produce eight 8-bit pixels per cycle by using the 32-bit RGBA format, but actually process only 8-bit data. However, even with this trick, the prior art 3D graphics parallel pipeline produces only eight 8-bit pixels per cycle. The parallel pipeline second preferred embodiment described above can produce 32 8-bit pixels per cycle, because it takes two cycles to load two sets of 32-bit pixels from two images. Thus, the parallel pipeline embodiment of the present invention increases the throughput by a factor of approximately four.

FIGS. 11A–11E illustrate the logical steps for performing P-type motion compensation according to the second standards published by the Moving Pictures Experts Group (MPEG-2) for compressed digital representation of video. These figures provide exemplary details for step 146 of FIG. 9. Motion compensation takes advantage of the fact that each frame in a video sequence is often very similar to its preceding and following frames. Frames can thus be predicted from the preceding frame. A video encoder identifies predictor macroblocks within a frame that will change in position and direction. Only the relatively small difference between each predictor block and an affected current block within a frame (called the motion compensation residual) will ultimately be transferred to a receiver. An inverse discrete cosine transform (IDCT) is performed on a frequency domain representation of the residual difference between frames to provide a spatial domain representation. P-type motion compensation combines a single preceding frame with this IDCT data to produce a predicted frame. The frame data are bilinearly filtered and added to the IDCT results. In general, data from a source 0 (frame data) is processed with data from a source 1 (IDCT data).

The frame data element size is preferably preset to 8 bits, with a 2×2 block size. The IDCT data uses 16-bit data elements with a 1×1 block size. Thus, the output size is 16×8, allowing only 16 of each type of coordinate to be processed through the pipeline at a time. Mapping the coordinates of the frame data to the coordinates of the IDCT data is done on a one-to-one basis, so the perspective inverse-mapping coefficients are preferably preset to the same values, as noted above in the description of image averaging. As for image averaging, the type of mapping is set to perspective inverse mapping with a normal access pattern.

Like FIG. 10A, FIG. 11A illustrates logic for obtaining coordinates and corresponding memory addresses for the two sources. At a step 222, the enhanced rasterization unit generates 16 (u, v) coordinates for the frame data (source 0). Although a frame data element is 8 bits, the enhanced rasterization unit generates 16 coordinates, because the block size is 2×2. Thus, there is no performance degradation. The 2×2 block size also enables bilinear filtering of the frame data Analogous to the image averaging example described above, the enhanced rasterization unit also generates a compressed representation of 16 (x, y) destination (i.e., output) coordinates. At a step 224, the enhanced rasterization unit passes the 16 (u, v) coordinates to the enhanced Z-buffer. The enhanced rasterization unit also passes the compressed 16 (x, y) destination coordinates to the enhanced Z-buffer via a pipeline buffer (not shown). The 16 (x, y) destination coordinates will be passed through the pipeline to the output buffer. During the same clock cycle, the enhanced rasterization unit generates 16 (u, v) coordinates for the IDCT data (source 1), at a step 226. The IDCT data is not bilinearly filtered. As with the image averaging example described above, the enhanced rasterization unit need not generate another compressed representation of the (x, y) destination coordinates, because a single frame of data will be processed and output to one set of destination coordinates. However, the enhanced rasterization unit may perform a duplicate generation of the compressed representation of the (x, y) destination coordinates if it is more efficient from the perspective of hardware design and/or operation.

At the next clock cycle, the enhanced Z-buffer passes the first 8 of the 16 (u, v) coordinates for the frame data to the enhanced texture address unit, shown at a step 232. Because the block size is set to 2×2 for the frame data, one coordinate will be converted to 4 memory addresses. Eight coordinates will result in 32 memory addresses, which is the limit of the preferred enhanced texture address unit. Thus, only 8 coordinates are passed to the texture address unit at a time. During the same clock cycle, the enhanced texture address unit converts the first 8 (u, v) coordinates for the frame data into a first set of 32 addresses where the frame data are stored in memory, at a step 234. Enhanced texture address unit preferably uses the same address computation as described above for image averaging. Steps 232 and 234 are grouped as a single block 230*a* of steps that will be repeated for different coordinates. Control then passes to a step 236 of FIG. 11B, via a connector D.

FIG. 11B illustrates continued logic for obtaining a first set of frame data from memory and a second set of coordinates and memory addresses for the video motion compensation operation. At step 236, the enhanced texture address unit passes the first set of 32 addresses at which the frame data are stored, to the enhance texture cache. As with analogous steps above, the enhanced texture address unit also passes the compressed 16 (x, y) destination coordinates to the enhanced texture cache on their way to the output buffer.

At a decision step 242, the enhanced texture cache determines whether the first set of frame data are already available in the internal data cache area of the enhanced texture cache as a result of some previous processing. If not, the enhanced texture cache retrieves the first set of frame data from the first set of 32 addresses in main memory and puts the data into the internal data cache area, at a step 244. Once the first set of frame data are available in the internal data cache area, the enhanced texture cache loads the first set of frame data from the internal data cache area to an internal line buffer, at a step 246. Obtaining and loading the frame data may take multiple clock cycles, depending on whether the frame data are already available in the internal data cache area. Steps 242 through 246 are grouped as a single block 240a of steps that will be repeated for different addresses and data.

At a step 230b, the enhanced Z-buffer passes the second 8 of the 16 (u, v) coordinates for frame data to the enhanced texture address unit. During the same clock cycle, the enhanced texture address unit converts the second 8 (u, v) coordinates for the frame data into a second set of 32 addresses where the frame data are stored. Also during the same clock cycle, the enhanced rasterization unit passes the 16(u,v) coordinates for the IDCT data to the enhanced Z-buffer, at a step 252. Control then passes to a step 254 of FIG. 11C via a connector E.

FIG. 11C illustrates continued logic for obtaining a second set of data for the reference frame and for obtaining memory addresses for IDCT data in the video motion compensation operation. At a step 254, the enhanced texture cache passes the first set of frame data to a queue 0 of the VFU. As above, the enhanced texture cache also passes the compressed 32 (x, y) destination coordinates to the VFU on their way to the output buffer. During the same clock cycle, the enhanced texture address unit passes the second set of 32 addresses at which the second set of frame data are stored in memory to the enhanced texture cache, at a step 256.

At a block 240b, steps 242 through 246 are repeated for the enhanced texture cache to retrieve and load the second set of frame data from the second set of 32 addresses in memory. As above, obtaining and loading the second set of frame data may take multiple clock cycles, depending on whether the second set of frame data are already available in the internal data cache area.

At a block 230c, steps 232 and 234 are repeated for the IDCT coordinates. Specifically, the enhanced Z-buffer passes the 16 (u, v) coordinates for the IDCT data to the enhanced texture address unit. As the coordinates are being passed in, the enhanced texture address unit converts the 16 (u, v) coordinates into 32 addresses at which the IDCT data are stored.

Preferably during the same clock cycle, at a step 258, the VFU accesses the interpolation coefficients from the enhanced texture address unit. The interpolation coefficients were provided by the host CPU to the configuration registers and retrieved by the enhanced texture address unit from the configuration registers during initialization. The VFU stores the interpolation coefficients in the register file of the vector streaming engine. Control then passes to a step 260a of FIG. 11D via a connector F.

FIG. 11D illustrates continued logic for bilinearly filtering the frame data and obtaining IDCT data from main memory for the video motion compensation operation. At a step 260a, the VFU computes a partitioned inner product with the first set of frame data in queue 0 and the interpolation coefficients. The first set of frame data includes eight partitions corresponding to the first eight coordinates. Each partition has four 8-bit elements (i.e., 4 bytes), because a 2×2 block is used. Thus, the first set of frame data comprises 32 bytes (i.e., 8 partitions times 4 bytes per partition). The partitioned inner product operates on these 32 bytes and the interpolation coefficients to produce one byte for each partition for a total of 8 bytes (i.e., 64 bits).

At a step 262a, the VFU stores the resulting first inner product value (64 bits) into a register of the register file for later use. Preferably during the same clock cycle, at a step 264, the enhanced texture cache passes the second set of frame data to queue 0.

At a step 260b, the VFU again computes a partitioned inner product with the second set of frame data in queue 0 and the interpolation coefficients. This second inner product operation produces a second 64-bit inner product value. Preferably during the same clock cycle, at a step 266, the enhanced texture address unit passes the 32 addresses at which the IDCT data are stored to the enhanced texture cache.

At a step 262b, the VFU appends the second inner product value to the register in the register file that holds the first inner product value. The combined inner product values are 128 bits wide. Preferably, during the same clock cycle, at a block 240c, the enhanced texture cache retrieves and loads the IDCT data from the corresponding 32 addresses in memory. Control then passes to a step 268 of FIG. 11E via a connector G.

FIG. 11E illustrates continued logic for adding the filtered data to the IDCT data for the video motion compensation. At step 268, the enhanced texture cache passes the IDCT data to a queue 1 of the VFU. At a step 270, the VFU performs a partitioned add with the stored inner product values and the IDCT data of queue 1 to produce a 128-bit result. The VFU then passes the result to the output buffer, at a step 272. Control then passes to a step 280 of FIG. 11F via a connector H.

FIG. 11F illustrates continuing logical steps for outputting partitioned add results to the main memory for motion compensation. At step 280, the output buffer generates a compressed output address and an address mask from the compressed 16 (x, y) destination coordinates. For motion compensation processing, the output buffer does not concatenate successive results, because addresses are not consecutive. At a step 282, the output buffer passes the 128-bit partitioned add result from the steps above to the write buffer. The output buffer also passes the compressed output address and mask to the write buffer. At a step 284, the output buffer stores the partitioned add result and the compressed output address and mask. At a decision step 286, the write buffer determines whether the start watermark has been reached. As above, the start watermark is preferably set to a predefined value of four. If less than four entries of data have been passed to the write buffer, control returns to step 284 to await storing another entry of data. Once the start watermark has been reached, the write buffer bursts the concatenated data to the main memory through the memory controller, at a step 288. At a decision step 290, the write buffer determines whether the stop watermark has been reached. Also as above, the stop watermark is preferably set to zero, so that the write buffer sends all data to the main memory before stopping. If the stop watermark has not been reached, control returns to step 288 to burst more data to the main memory. Once the stop watermark is reached, control returns to step 284 to await more data.

Motion compensation is not possible with conventional graphics processors. However, the above discussion illustrates how embodiments of the present invention can be configured and executed to perform image and video processing in a unified architecture without degrading 3D graphics processing. The architecture of the present invention enables more efficient processing via automatic arrangement of the data transferred to and from the vector functional units. For example, all required data in bilinear and trilinear modes may already be duplicated and fed to the vector functional unit(s). In addition, the vector functional unit(s) can specify the width of the output so that it is concatenated with the previous results, which eliminates the need for separate merge instructions. Further, the input data are preferably queued so that the number of stalls in processing can be reduced.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A programmable graphics pipeline for processing and rendering variable length multimedia data, wherein different types of multimedia data are divided into partitions of differing lengths, comprising:
   (a) an instruction cache for storing at least graphics and media instructions;
   (b) a first register file for storing the variable length multimedia data and intermediate data;
   (c) a first vector functional unit in communication with the instruction cache and the register file, said vector functional unit performing at least graphics and media instructions, to render at least graphics and media data; and
   (d) an enhanced texture cache in communication with the first vector functional unit, the first vector functional unit obtaining from said enhanced texture cache a vector of at least one partition of the variable length multimedia data, wherein said enhanced texture cache is not limited to storage of one type of multimedia data, but instead, is configured to store multiple partitions that are of differing lengths, to enable storage of the different types of multimedia data.

2. The programmable graphics pipeline of claim 1, further comprising a memory and an output buffer, wherein the enhanced texture cache comprises:
   (a) a line buffer that provides multiple read ports for accessing the multimedia data in multiple partitions of differing lengths; and
   (b) a cache area in communication with the line buffer, said cache area storing the multimedia data received from the memory and the output buffer.

3. The programmable graphics pipeline of claim 2, further comprising an enhanced texture address unit in communication with the enhanced texture cache, said enhanced texture address unit being employed for converting multiple inverse-mapped source coordinates into absolute memory addresses of the multimedia data in an arbitrary-sized block.

4. The programmable graphics pipeline of claim 3, wherein the enhanced texture address unit further generates filter coefficients for the multiple inverse-mapped source coordinates for one of a bilinear filtering and a trilinear filtering of the data.

5. The programmable graphics pipeline of claim 3, further comprising an enhanced rasterization unit in communication with the enhanced texture address unit, said enhanced rasterization unit being employed for generating:
   (a) a plurality of destination coordinates for at least one of:
      (i) a plurality of primitives being rendered; and
      (ii) a media processing output; and
   (b) a plurality of source coordinates for at least one of:
      (i) texture data associated with the plurality of destination coordinates for the plurality of primitives; and
      (ii) media data associated with the plurality of destination coordinates for the media processing.

6. The programmable graphics pipeline of claim 5, wherein the plurality of primitives include at least one of:
   (a) dots;
   (b) lines;
   (c) triangles;
   (d) rectangles; and
   (e) polygons.

7. The programmable graphics pipeline of claim 5, further comprising an enhanced Z-buffer unit in communication with the enhanced rasterization unit and the enhanced texture address unit, said enhanced Z-buffer unit being employed for loading source coordinates of a primitive being rendered to provide the enhanced texture address unit with variable access to the source coordinates if perspective address generation cannot be used.

8. The programmable graphics pipeline of claim 7, wherein the enhanced Z-buffer unit is further employed for determining a depth of a new source pixel in relation to an old source pixel.

9. The programmable graphics pipeline of claim 1, further comprising a blending unit that is in communication with the first vector functional unit, said blending unit being employed for:
   (a) combining a graphics data output from the first vector functional unit with a color value to produce a blended value; and
   (b) combining the blended value with a destination pixel value.

10. The programmable graphics pipeline of claim 9, further comprising a write buffer in communication with the blending unit, said write buffer sending multiple write transactions to a memory, to reduce page misses.

11. The programmable graphics pipeline of claim 1, further comprising an output buffer in communication with the first vector functional unit, said output buffer being employed for concatenating one of successive image outputs and successive video outputs from the first vector functional unit, to reduce a number of subsequent write transactions to a memory.

12. The programmable graphics pipeline of claim 11, further comprising a write buffer in communication with the output buffer, said write buffer sending multiple write transactions to a memory, to reduce page misses.

13. The programmable graphics pipeline of claim 1, further comprising an output buffer in communication with the first vector functional unit and the enhanced texture cache, said output buffer being employed for:
   (a) concatenating successive media processing output from the first vector functional unit to produce concatenated data;

(b) providing the concatenated data as input to the enhanced texture cache; and (c) converting a compressed format of destination coordinates into a plurality of destination addresses for media processing output data.

14. The programmable graphics pipeline of claim 1, further comprising a configuration register in communication with the first vector functional unit, said configuration register providing the first vector functional unit with partitioned data access parameters and a location of a current instruction thereby instructing the vector functional unit to perform one of a graphics process and a media process.

15. The programmable graphics pipeline of claim 1, further comprising:

(a) a second vector functional unit in communication with the instruction cache and performing the graphics and media instructions being performed by the first vector functional unit, to produce parallel graphics and media data; and (b) a second register file in communication with the second vector functional unit, said second register file storing additional multimedia data and additional intermediate data.

* * * * *